(12) United States Patent
Rowney et al.

(10) Patent No.: US 8,751,506 B2
(45) Date of Patent: *Jun. 10, 2014

(54) PERSONAL COMPUTING DEVICE-BASED MECHANISM TO DETECT PRESELECTED DATA

(75) Inventors: Kevin T. Rowney, San Francisco, CA (US); Michael R. Wolfe, San Francisco, CA (US); Mythili Gopalakrishnan, San Francisco, CA (US); Vitall A. Fridman, Belmont, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/246,774

(22) Filed: Sep. 27, 2011

(65) Prior Publication Data

US 2012/0016884 A1     Jan. 19, 2012

Related U.S. Application Data

(63) Continuation of application No. 10/607,718, filed on Jun. 27, 2003, now Pat. No. 8,041,719, which is a continuation-in-part of application No. 10/431,145, filed on May 6, 2003, now Pat. No. 7,673,344.

(51) Int. Cl.
*G06F 17/30*     (2006.01)
*G06F 15/16*     (2006.01)

(52) U.S. Cl.
USPC ........... 707/747; 707/694; 707/711; 709/225; 709/229

(58) Field of Classification Search
USPC ............... 707/3, 711, 747, 694; 709/225, 229
See application file for complete search history.

(56) References Cited

U.S. PATENT DOCUMENTS

| | | | |
|---|---|---|---|
| 4,858,152 A | 8/1989 | Estes | |
| 5,212,821 A | 5/1993 | Gorin et al. | |
| 5,379,391 A | 1/1995 | Belsan et al. | |
| 5,384,892 A | 1/1995 | Strong | |
| 5,577,249 A * | 11/1996 | Califano | ............. 707/694 |
| 5,796,948 A | 8/1998 | Cohen | |

(Continued)

FOREIGN PATENT DOCUMENTS

| | | |
|---|---|---|
| CA | 2 499 508 | 4/2004 |
| CA | 2 597 083 | 8/2006 |

(Continued)

OTHER PUBLICATIONS

Alonso, Omar, et al, Oracle Secure Enterprise Search 10g, An Oracle Technical White Paper, Mar. 2006, 21 pages.

(Continued)

*Primary Examiner* — Apu Mofiz
*Assistant Examiner* — Chelcie Daye
(74) *Attorney, Agent, or Firm* — Lowenstein Sandler LLP

(57) ABSTRACT

A method and apparatus for detecting pre-selected data stored on a personal computing device is described. In one embodiment, contents of data storage media of a personal computing device are searched for pre-selected sensitive data. In one embodiment, if at least a portion of the pre-selected sensitive data is detected, a notification of the detection of the pre-selected data is sent to a system via a network. In another embodiment, if at least a portion of pre-selected sensitive data is detected, the access to this data is blocked.

16 Claims, 13 Drawing Sheets

(56) References Cited

U.S. PATENT DOCUMENTS

| | | | |
|---|---|---|---|
| 5,832,212 A | 11/1998 | Cragun et al. | |
| 5,835,722 A * | 11/1998 | Bradshaw et al. | 709/225 |
| 5,883,588 A | 3/1999 | Okamura | |
| 5,884,033 A | 3/1999 | Duvall et al. | |
| 5,889,958 A | 3/1999 | Willens | |
| 5,892,905 A | 4/1999 | Brandt et al. | |
| 5,958,015 A | 9/1999 | Dascalu | |
| 5,960,080 A | 9/1999 | Fahlman et al. | |
| 5,996,011 A | 11/1999 | Humes | |
| 6,004,276 A | 12/1999 | Wright et al. | |
| 6,029,144 A | 2/2000 | Barrett et al. | |
| 6,047,283 A | 4/2000 | Braun | |
| 6,055,538 A | 4/2000 | Kesseich et al. | |
| 6,065,056 A | 5/2000 | Bradshaw et al. | |
| 6,073,142 A | 6/2000 | Geiger et al. | |
| 6,094,689 A | 7/2000 | Embry et al. | |
| 6,125,371 A | 9/2000 | Bohannon et al. | |
| 6,138,168 A | 10/2000 | Kelly et al. | |
| 6,233,618 B1 * | 5/2001 | Shannon | 709/229 |
| 6,256,631 B1 | 7/2001 | Malcolm | |
| 6,266,775 B1 | 7/2001 | Kamba | |
| 6,289,375 B1 | 9/2001 | Knight et al. | |
| 6,289,462 B1 | 9/2001 | McNabb et al. | |
| 6,314,190 B1 | 11/2001 | Zimmermann | |
| 6,321,224 B1 | 11/2001 | Beall et al. | |
| 6,347,374 B1 | 2/2002 | Drake et al. | |
| 6,360,215 B1 | 3/2002 | Judd et al. | |
| 6,374,241 B1 | 4/2002 | Lamburt | |
| 6,396,513 B1 | 5/2002 | Helfman et al. | |
| 6,442,607 B1 | 8/2002 | Korn et al. | |
| 6,442,686 B1 | 8/2002 | McArdle et al. | |
| 6,453,338 B1 | 9/2002 | Shiono | |
| 6,507,846 B1 * | 1/2003 | Consens | 707/100 |
| 6,539,430 B1 | 3/2003 | Humes | |
| 6,604,141 B1 | 8/2003 | Ventura | |
| 6,618,725 B1 | 9/2003 | Fukuda et al. | |
| 6,636,838 B1 | 10/2003 | Perlman et al. | |
| 6,639,615 B1 | 10/2003 | Majumdar | |
| 6,701,314 B1 | 3/2004 | Conover et al. | |
| 6,711,579 B2 | 3/2004 | Balakrishnan | |
| 6,714,936 B1 | 3/2004 | Nevin, II | |
| 6,732,087 B1 | 5/2004 | Hughes et al. | |
| 6,738,908 B1 | 5/2004 | Bonn et al. | |
| 6,768,986 B2 | 7/2004 | Cras et al. | |
| 6,769,032 B1 | 7/2004 | Katiyar et al. | |
| 6,778,979 B2 | 8/2004 | Grefenstette et al. | |
| 6,779,120 B1 | 8/2004 | Valente et al. | |
| 6,829,613 B1 | 12/2004 | Liddy | |
| 6,829,635 B1 | 12/2004 | Townshend | |
| 6,834,286 B2 | 12/2004 | Srinivasan | |
| 6,871,284 B2 | 3/2005 | Cooper et al. | |
| 6,941,466 B2 | 9/2005 | Mastrianni et al. | |
| 6,947,985 B2 | 9/2005 | Hegli et al. | |
| 6,965,886 B2 | 11/2005 | Govrin et al. | |
| 6,983,186 B2 | 1/2006 | Navani et al. | |
| 6,996,788 B2 | 2/2006 | Akiba et al. | |
| 7,000,154 B1 | 2/2006 | LeDuc | |
| 7,003,562 B2 | 2/2006 | Mayer | |
| 7,010,572 B1 | 3/2006 | Benjamin et al. | |
| 7,114,185 B2 | 9/2006 | Moore et al. | |
| 7,130,885 B2 | 10/2006 | Chandra et al. | |
| 7,146,402 B2 | 12/2006 | Kucherawy | |
| 7,162,738 B2 | 1/2007 | Dickinson, III et al. | |
| 7,191,252 B2 | 3/2007 | Redlich et al. | |
| 7,203,749 B2 | 4/2007 | Hiraga | |
| 7,222,158 B2 | 5/2007 | Wexelblat | |
| 7,237,008 B1 | 6/2007 | Tarbotton et al. | |
| 7,237,267 B2 | 6/2007 | Rayes et al. | |
| 7,249,175 B1 | 7/2007 | Donaldson | |
| 7,320,004 B1 | 1/2008 | DeLuca et al. | |
| 7,447,718 B2 | 11/2008 | Orumchian | |
| 7,464,402 B2 | 12/2008 | Briscoe et al. | |
| 7,472,114 B1 | 12/2008 | Rowney et al. | |
| 7,516,492 B1 | 4/2009 | Nisbet et al. | |
| 7,523,498 B2 | 4/2009 | Fellenstein et al. | |
| 7,685,626 B2 | 3/2010 | Malcolm | |
| 7,716,217 B2 | 5/2010 | Marston et al. | |
| 7,716,240 B2 | 5/2010 | Lim | |
| 7,725,732 B1 | 5/2010 | Ballard | |
| 7,756,843 B1 | 7/2010 | Palmer | |
| 7,774,363 B2 | 8/2010 | Lim | |
| 7,788,235 B1 | 8/2010 | Yeo | |
| 7,877,409 B2 | 1/2011 | Lim | |
| 7,882,560 B2 | 2/2011 | Kraemer | |
| 7,886,359 B2 | 2/2011 | Jones et al. | |
| 7,996,373 B1 | 8/2011 | Zoppas | |
| 7,996,374 B1 | 8/2011 | Jones et al. | |
| 7,996,385 B2 | 8/2011 | Rowney | |
| 8,011,003 B2 | 8/2011 | Rowney | |
| 8,024,431 B2 | 9/2011 | Hoffman | |
| 8,041,719 B2 | 10/2011 | Rowney | |
| 8,051,187 B2 | 11/2011 | Noy | |
| 8,065,739 B1 | 11/2011 | Bruening | |
| 8,131,745 B1 | 3/2012 | Hoffman | |
| 8,225,371 B2 | 7/2012 | Jones et al. | |
| 8,255,370 B1 | 8/2012 | Zoppas | |
| 2001/0027451 A1 | 10/2001 | Taguchi et al. | |
| 2001/0037324 A1 | 11/2001 | Agrawal et al. | |
| 2002/0010679 A1 | 1/2002 | Felsher | |
| 2002/0069098 A1 | 6/2002 | Schmidt | |
| 2002/0073313 A1 | 6/2002 | Brown et al. | |
| 2002/0093676 A1 | 7/2002 | Parry | |
| 2002/0120586 A1 | 8/2002 | Masaki et al. | |
| 2002/0129140 A1 | 9/2002 | Peled et al. | |
| 2002/0138579 A1 | 9/2002 | Goldberg | |
| 2002/0178228 A1 | 11/2002 | Goldberg | |
| 2002/0198766 A1 | 12/2002 | Magrino et al. | |
| 2002/0199095 A1 | 12/2002 | Bandini et al. | |
| 2003/0051026 A1 | 3/2003 | Carter et al. | |
| 2003/0093518 A1 | 5/2003 | Hiraga | |
| 2003/0167402 A1 | 9/2003 | Stolfo et al. | |
| 2004/0039991 A1 | 2/2004 | Hopkins et al. | |
| 2004/0185885 A1 | 9/2004 | Kock | |
| 2004/0187024 A1 | 9/2004 | Briscoe et al. | |
| 2004/0193910 A1 | 9/2004 | Moles | |
| 2004/0225645 A1 | 11/2004 | Rowney et al. | |
| 2005/0027723 A1 | 2/2005 | Jones et al. | |
| 2005/0039033 A1 | 2/2005 | Meyers et al. | |
| 2005/0060537 A1 | 3/2005 | Stamos et al. | |
| 2005/0081121 A1 | 4/2005 | Wedel | |
| 2005/0086252 A1 | 4/2005 | Jones et al. | |
| 2005/0096048 A1 | 5/2005 | Clare | |
| 2005/0132206 A1 | 6/2005 | Palliyil et al. | |
| 2005/0138110 A1 | 6/2005 | Redlich et al. | |
| 2005/0182765 A1 | 8/2005 | Liddy | |
| 2005/0216771 A1 | 9/2005 | Malcolm | |
| 2005/0257267 A1 | 11/2005 | Williams et al. | |
| 2006/0005247 A1 | 1/2006 | Zhang et al. | |
| 2006/0143459 A1 | 6/2006 | Villaron et al. | |
| 2006/0184549 A1 | 8/2006 | Rowney et al. | |
| 2006/0224426 A1 | 10/2006 | Goossens | |
| 2006/0224589 A1 | 10/2006 | Rowney et al. | |
| 2006/0253597 A1 | 11/2006 | Mujica | |
| 2007/0011158 A1 | 1/2007 | Parikh | |
| 2007/0130255 A1 | 6/2007 | Wolovitz et al. | |
| 2007/0136788 A1 | 6/2007 | Monahan et al. | |
| 2007/0156897 A1 | 7/2007 | Lim | |
| 2007/0169182 A1 | 7/2007 | Wolfond et al. | |
| 2007/0261099 A1 | 11/2007 | Broussard | |
| 2007/0300306 A1 | 12/2007 | Hussain | |
| 2008/0066150 A1 | 3/2008 | Lim et al. | |
| 2008/0148357 A1 | 6/2008 | Chen et al. | |
| 2008/0235760 A1 | 9/2008 | Broussard | |
| 2008/0263626 A1 | 10/2008 | Bainter et al. | |
| 2009/0013399 A1 | 1/2009 | Cottrell et al. | |
| 2009/0037594 A1 | 2/2009 | Sever et al. | |
| 2010/0031312 A1 | 2/2010 | Dixitx | |

(56) References Cited

U.S. PATENT DOCUMENTS

| | | | |
|---|---|---|---|
| 2010/0169970 A1 | 7/2010 | Stolfo et al. | |
| 2010/0251363 A1 | 9/2010 | Todorovic | |
| 2010/0332481 A1 | 12/2010 | Rowney | |

FOREIGN PATENT DOCUMENTS

| | | |
|---|---|---|
| GB | 2 343 030 A | 4/2000 |
| GB | 2466367 A | 6/2010 |
| JP | 2002-189643 | 5/2002 |
| JP | 2005-539334 | 12/2005 |
| JP | 2008-171101 | 7/2008 |
| JP | 2008-537195 | 9/2008 |
| WO | WO2004/027653 | 4/2004 |
| WO | WO2006/088952 | 8/2006 |

OTHER PUBLICATIONS

Attenex, Attenex Patterns Suite, http://www.attenex.com/products_services/attenex_patterns_suite.aspx, Downloaded Feb. 20, 2008, 2 pages.
Autonomy, Autonomy Group product overview, http://www.autonomy.com/content/products/index.en.html, Downloaded Feb. 20, 2008, 2 pages.
Autonomy, Security, http://www.autonomy.com/content/Technology/Technology_Benefits/security, Feb. 20, 2008, 2 pages.
Autonomy, Technology overview, http://www.autonomy.com/content/Technmology/index.en.html, Downloaded Feb. 20, 2008, 2 pages.
Autonomy, Limitations of Other Approaches, http://www.autonomy.com/content/Technology/Limitations_Other_Approaches, Downloaded Feb. 20, 2008, 2 pages.
Buchta, Stefan, Oracle Secure Enterprise Search Version 10.1.8.2, An Oracle Technical White Paper, Oct. 2007, 30 pages.
(CISCO) A Report From Ironport Systems , "Data Loss Prevention Best Practices—Managing Sensitive Data in the Enterprise", 2007, 21 pages.
Clearwell Systems, The Clearwell E-Discovery Platform®, http://www.clearwellsystems.com/products/e-discovery-platform, Downloaded Feb. 20, 2008 2 pages.
Clearwell Systems, The Clearwell E-Discovery Platform: Analysis, http://www.clearwellsystems.com/products/e-discovery-analysis.php, Downloaded Feb. 20, 2008, 1 page.
Clearwell Systems, The Clearwell E-Discovery Platform: Case Management, http://www.clearwellsystems.com/products/e-discovery-case-management, Downloaded Feb. 20, 2008 2 pages.
Clearwell Systems The Clearwell E-Discovery Platform: Processing, http://www.clearwellsystems.com/products/e-discovery-processing.php, Downloaded Feb. 20, 2008, 2 pages.
Clearwell Systems The Clearwell E-Discovery Platform: Review, http://www.clearwellsystems.com/products/e-discovery-review.php, Downloaded Feb. 20, 2008 2 pages.
Clearwell Systems The Clearwell E-Discovery Platform: Search &Cull-Down, http://www.clearwellsystems.com/products/e-discovery-search-cull.php, Downloaded Feb. 20, 2008 1 page.
Dale, et al., "Programming and Problem Solving with C++," 2002, Jones and Bartlett Publishers, 3rd Edition, pp. 653-662.
Deitel, et al., "C++—How to Program," 2001, Prentice Hall, 3rd Edition, pp. 273-279.
Fast, Fast ESP Revitalizing your search experience with intelligent, user-centric search, 2007, Fast Search & Transfer ASA. , 6 pages.
Google, Google Search Appliance, http://www.google.com/enterprise/gsa/, Downloaded, Feb. 20, 2008, 2 pages.
Guidance Software, EnCase® eDiscovery Suite, http://www.guidancesoftware.com/products/ediscovery_index.aspx, Downloaded Feb. 20, 2008, 2 pages.
Kaufman, et al., "Network Security-Private Communication in a Public World," 1995, Prentice, Hall PTR, p. 80.
Koch, et al., "Oracle8—The Complete Reference," 1997, Osborn McGraw-Hill, pp. 9-7 and 51-62.
Krishnaprasad, Muralidhar, et al, Oracle Searching Enterprise Applications (Siebel 7.8 and E-Business Suite 11i) with Oracle Secure Enterprise Search 10.1.8, An Oracle White Paper, Jan. 2007, 25 pages.
Oracle Secure Enterprise Search 10G, Mar. 2006, 8 pages.
Oracle8™ Tuning, Release 8.0, Dec. 1997, Oracle®.
GB0921722.5 Search Report dated Mar. 26, 2010, 1 page.
PCT Search Report PCT /US03/30178 dated Mar. 11, 2004, 5 pages.
PCT Search Report PCT /US06/5317 dated Jul. 24, 2006, 5 pages.
White, Ron, "How Computers Work" Que Coporation, 6th Edition, 2002, pp. 12-15 and 304.
Zantaz, Enterprise Archive Solution (EAS) Product family, Datasheet, 4 pages.
Office Action for U.S. Appl. No. 10/247,002 mailed Mar. 3, 2006.
Office Action for U.S. Appl. No. 10/247,002 mailed Aug. 21, 2006.
Office Action for U.S. Appl. No. 10/247,002 mailed Jan. 23, 2007.
Office Action for U.S. Appl. No. 10/247,002 mailed Sep. 17, 2007.
Office Action for U.S. Appl. No. 10/247,002 mailed Dec. 12, 2007.
Office Action for U.S. Appl. No. 10/247,002 mailed Jun. 18, 2008.
Office Action for U.S. Appl. No. 10/247,002 mailed Nov. 25, 2008.
Office Action for U.S. Appl. No. 10/247,002 mailed May 21, 2009.
Office Action for U.S. Appl. No. 10/247,002 mailed Dec. 31, 2009.
Office Action for U.S. Appl. No. 10/431,145 mailed Oct. 23, 2006.
Office Action for U.S. Appl. No. 10/431,145 mailed Jul. 26, 2007.
Office Action for U.S. Appl. No. 10/431,145 mailed Feb. 25, 2008.
Notice of Allowance for U.S. Appl. No. 10/431,145 mailed Aug. 20, 2008.
Notice of Allowance for U.S. Appl. No. 10/431,145 mailed Jun. 5, 2009.
Office Action for U.S. Appl. No. 12/490,258 mailed Mar. 31, 2011.
Office Action for U.S. Appl. No. 10/607,718 mailed Feb. 10, 2006.
Office Action for U.S. Appl. No. 10/607,718 mailed Jun. 28, 2006.
Office Action for U.S. Appl. No. 10/607,718 mailed Nov. 15, 2006.
Office Action for U.S. Appl. No. 10/607,718 mailed Jul. 10, 2007.
Office Action for U.S. Appl. No. 10/607,718 mailed Jan. 8, 2008.
Office Action for U.S. Appl. No. 10/607,718 mailed Jul. 3, 2008.
Office Action for U.S. Appl. No. 10/607,718 mailed Nov. 14, 2008.
Office Action for U.S. Appl. No. 10/607,718 mailed May 1, 2009.
Office Action for U.S. Appl. No. 10/607,718 mailed Nov. 9, 2009.
Office Action for U.S. Appl. No. 10/607,718 mailed Apr. 12, 2010.
Office Action for U.S. Appl. No. 10/607,718 mailed Aug. 17, 2010.
Office Action for U.S. Appl. No. 10/607,718 mailed Feb. 3, 2011.
Office Action for U.S. Appl. No. 10/833,538 mailed Oct. 31, 2006.
Office Action for U.S. Appl. No. 10/833,538 mailed Jul. 23, 2007.
Office Action for U.S. Appl. No. 10/833,538 mailed Feb. 14, 2008.
Notice of Allowance for U.S. Appl. No. 10/833,538 mailed Aug. 6, 2008.
Notice of Allowance for U.S. Appl. No. 12/266,545 mailed Mar. 25, 2011.
Office Action for U.S. Appl. No. 10/892,982 mailed Jan. 23, 2007.
Office Action for U.S. Appl. No. 10/892,982 mailed Sep. 17, 2007.
Office Action for U.S. Appl. No. 10/892,982 mailed Apr. 8, 2008.
Office Action for U.S. Appl. No. 10/892,982 mailed Oct. 27, 2008.
Office Action for U.S. Appl. No. 10/892,982 mailed Feb. 12, 2009.
Office Action for U.S. Appl. No. 10/892,982 mailed Jul. 20, 2009.
Office Action for U.S. Appl. No. 10/892,982 mailed Jan. 6, 2010.
Office Action for U.S. Appl. No. 12/982,750 mailed Apr. 11, 2011.
Office Action for U.S. Appl. No. 12/982,750 mailed Sep. 7, 2011.
Office Action for U.S. Appl. No. 10/892,615 mailed Apr. 27, 2007.
Office Action for U.S. Appl. No. 10/892,615 mailed Dec. 12, 2007.
Office Action for U.S. Appl. No. 10/892,615 mailed Apr. 21, 2008.
Office Action for U.S. Appl. No. 10/892,615 mailed Dec. 5, 2008.
Office Action for U.S. Appl. No. 10/892,615 mailed May 12, 2009.
Office Action for U.S. Appl. No. 10/892,615 mailed Mar. 24, 2010.
Office Action for U.S. Appl. No. 11/057,988 mailed Aug. 18, 2008.
Office Action for U.S. Appl. No. 11/057,988 mailed Jan. 28, 2009.
Office Action for U.S. Appl. No. 11/057,988 mailed Jul. 10, 2009.
Office Action for U.S. Appl. No. 11/057,988 mailed Mar. 18, 2010.
Office Action for U.S. Appl. No. 11/058,551 mailed Sep. 9, 2008.
Office Action for U.S. Appl. No. 11/058,551 mailed Mar. 20, 2009.
Office Action for U.S. Appl. No. 11/058,551 mailed Sep. 11, 2009.
Office Action for U.S. Appl. No. 11/058,551 mailed Mar. 8, 2010.
Office Action for U.S. Appl. No. 11/058,551 mailed Aug. 2, 2010.

(56) References Cited

OTHER PUBLICATIONS

Office Action for U.S. Appl. No. 11/058,551 mailed Apr. 11, 2011.
Office Action for U.S. Appl. No. 12/079,719 mailed Jan. 21, 2011.
Office Action for U.S. Appl. No. 12/179,630 mailed Aug. 31, 2010.
Notice of Allowance Action for U.S. Appl. No. 12/179,630 mailed Mar. 24, 2011.
Office Action for U.S. Appl. No. 12/079,660 mailed Dec. 22, 2010.
Office Action for U.S. Appl. No. 12/342,038 mailed May 3, 2011.
Office Action for U.S. Appl. No. 12/410,432 mailed Jul. 29, 2011.
USPTO Office Action for U.S. Appl. No. 12/490,258 mailed Dec. 6, 2011.
USPTO Notice of Allowance for U.S. Appl. No. 12/490,258 mailed Dec. 6, 2011.
USPTO Notice of Allowance for U.S. Appl. No. 10/607,718 mailed Jun. 17, 2011.
USPTO Office Action for U.S. Appl. No. 12/632,620 mailed Dec. 7, 2011.
USPTO Office Action for U.S. Appl. No. 12/632,620 mailed Apr. 24, 2012.
USPTO Notice of Allowance for U.S. Appl. No. 10/892,982 mailed Dec. 6, 2010.
USPTO Office Action for U.S. Appl. No. 12/982,750 mailed Dec. 30, 2011.
USPTO Office Action for U.S. Appl. No. 10/892,615 mailed Nov. 16, 2011.
USPTO Notice of Allowance for U.S. Appl. No. 10/892,615 mailed Mar. 14, 2012.
USPTO Notice of Allowance for U.S. Appl. No. 11/057,988 mailed Mar. 18, 2010.
USPTO Notice of Allowance for U.S. Appl. No. 12/079,719 mailed Jan. 21, 2011.
USPTO Office Action for U.S. Appl. No. 13/168,926, mailed Nov. 8, 2011.
USPTO Office Action for U.S. Appl. No. 13/168,926, mailed Jan. 25, 2012.
USPTO Notice of Allowance for U.S. Appl. No. 13/168,926, mailed Apr. 16, 2012.
USPTO Office Action for U.S. Appl. No. 12/079,660 mailed Aug. 19, 2010.
USPTO Office Action for U.S. Appl. No. 12/079,660 mailed Mar. 31, 2011.
USPTO Office Action for U.S. Appl. No. 12/409,449 mailed Mar. 12, 2012.
USPTO Office Action for U.S. Appl. No. 12/409,449 mailed Aug. 14, 2012.
USPTO Office Action for U.S. Appl. No. 12/346,606 mailed Jun. 8, 2012.
USPTO Office Action for U.S. Appl. No. 12/342,038 mailed Oct. 26, 2011.
USPTO Office Action for U.S. Appl. No. 12/342,038 mailed May 15, 2012.
USPTO Office Action for U.S. Appl. No. 12/395,554 mailed Nov. 23, 2011.
USPTO Office Action for U.S. Appl. No. 12/395,554 mailed Jan. 13, 2012.
USPTO Office Action for U.S. Appl. No. 12/410,432 mailed Dec. 16, 2011.
Lymberopoulos, Leonidas et al., "An Adaptive Policy Based Management Framework for Differentiated Services Networks," Third International Workshop on Policies for Distributed Systems, 2002, Relevant pp. 147-158, <http://ieeexplore.ieee.org/stamp/stamp.jsp?tp=&arnumber=1011302>.
Menezes, et al. "Handbook of Applied Cryptography", 1997, p. 389.
Shapiro, William et al., "How to Manage Persistent State in DRM Systems," Aug. 2001, 12 pages, InterTrust Technologies Corporation, Santa Clara, CA.

\* cited by examiner

PERSONAL COMPUTING DEVICE-BASED MECHANISM TO DETECT PRESELECTED DATA

RELATED APPLICATION

This application is a continuation of U.S. patent application Ser. No. 10/607,718, filed Jun. 27, 2003, which is a continuation-in-part of U.S. patent application Ser. No. 10/431,145, filed on May 7, 2003, and assigned to the assignee of the present application and hereby incorporated by reference.

FIELD OF INVENTION

The present invention relates to the field of processing data; more particularly, the present invention relates to detecting preselected (e.g., proprietary) data in information content.

BACKGROUND OF THE INVENTION

Many organizations store large amounts of security-sensitive information in relational databases. This type of data is usually subjected to very thorough security measures including physical security, access control, perimeter security restrictions, and—in some cases—encryption. Since access to database data is essential to the job function of many employees in the enterprise, there are many possible points of possible theft or accidental distribution of this information. Theft of information represents a significant business risk both in terms of the value of the intellectual property as well as the legal liabilities related to regulatory compliance.

Relational Database Systems

Relational database systems are useful for a huge range of applications. Relational structures hold data in a fashion that presents naturally intuitive ways to query the data, and has the added advantage of hiding the details of the underlying disk storage system from the user. The typical applications for database systems involve the storage and retrieval of a large number of smaller pieces of data that can be naturally formatted into a table structure. Relational databases have high utility because the types of queries that most people care about can be optimized using the well-known index structures outlined below.

The queries requested of relational database systems use a naturally intuitive predicate logic called Structured Query Language (SQL) that allows the user to succinctly request the tabular data that she/he may be looking for. Database tables almost always come equipped with an index that makes queries based on SQL more efficient. These indices are stored in memory using a data structure called a B-tree. The salient characteristics of B-trees most relevant to the current discussion are as follows:

B-trees are an abstract data structure based on the binary tree;

B-trees must contain some copies of the data that they index; and

B-trees are most efficient using the query examples outlined below.

Here are a number of query examples:

Exact match queries of the form A=v, where:
A refers to the column or "attribute" of a given database table
v refers to a specific attribute value
e.g., SELECT*FROM CUSTOMERS WHERE Income=30,000

Range queries of the form v1<A<v2, where:
A refers to the column or "attribute" of a given database table
e.g., SELECT*FROM CUSTOMERS WHERE 30<Income<40

Prefix queries of the form A MATCHES s*, where:
"s" refers to a specific string value
"s*" is a regular expression
e.g., Last_Name MATCHES "Smith*"

There are a number of references to original works in the field of database systems. The first is the seminal work on relational databases by E. F. Codd., "A Relational Model of Data for Large Shared Data Banks", Communications of the ACM, 13(6): 377-387, 1970.

The second reference is one of the first published works on the "B-Tree" data structure that is the fundamental data structure that enables efficient queries of the type outlined above. See Rudolf Bayer and Edward M. McCreight, "Organization and Maintenance of Large Ordered Indices", Record of the 1970 ACM SIGFIDET Workshop on Data Description and Access, Nov. 15-16, 1970, Rice University, Houston, Tex., USA (Second Edition with an Appendix), pages 107-141, ACM, 1970.

Information Retrieval Systems

Information retrieval is a broad field that deals with the storage and retrieval of textual data found in documents. These systems are different from those of database systems chiefly in their focus on standard documents instead of tabular data. Early examples of this system were developed as part of the SMART system at Cornell. Today, the best-known information retrieval applications are web-based search engines like Google, Inktomi, and AltaVista. The typical way to use these systems is to find a reference to a document that is part of a larger set of digital documents. The user experience for these applications usually consists of a series of queries interleaved with browsing of the results. Results of the queries are presented in order of descending relevance, and the user is able to refine the queries after further browsing. As with relational databases, the huge popularity of these systems is due to the ability of the underlying indices to deliver quick responses to the types of queries that people find most useful.

Most of these systems are based on indices that are derived from so-called "concordances" that are built up from the collection of documents indexed. These concordances contain a data structure that lists, for each word, the location of each occurrence of that word in each of the documents. Such data structures allow quick lookups of all documents that contain a particular term. For user queries that ask for all documents that contain a collection of terms, the index is structured so that it represents a large number of vectors in Euclidean vector space of high dimension. The user's list of query terms is then also re-interpreted as a vector in this space. The query is run by finding which vectors in the document space are nearest to the query vector. This last approach has a variety of different optimizations applied to it for accuracy and speed, and is called the "cosine metric".

As mentioned above, the typical user interaction with these sorts of systems is an iterative cycle of querying, browsing, refining, and back to querying again. Query results are usually large numbers of documents that are ranked in order of relevance, and the false positive rate can be very high. Here are some classic examples of queries.

Boolean queries like:
a) all documents that contain the terms "database" and "indices"
b) all documents that contain "database" or "indices" but not "Sybase"

Link-based queries like:

a) all documents that are linked to by documents that contain the term "dog"

b) the most "popular" (i.e. linked to) document that contains the word "dog"

One of the first significant implementation projects of information retrieval systems is the SMART system at Cornell. This system contains many of the essential components of information retrieval systems still in use today: C. Buckley, "Implementation of the SMART Information Retrieval System", Technical Report TR85-686, Cornell University, 1985

The WAIS project was an early application of the massively parallel super-computer produced by Thinking Machines Inc. This is one of the first fielded information retrieval systems made available over the Internet. This primary reference source for this work is by Brewster Kahle and Art Medlar: "An Information System for Corporate Users: Wide Area Information Servers." Technical Report TMC-199, Thinking Machines, Inc., April 1991, version 3.19.

Among the many contemporary commercial vendors of Internet search services is Google. Google's real breakthrough in search accuracy is its ability to harvest data from both the text of the documents that are indexed as well as the hyper-link structure. See Sergey Brin, Lawrence Page, "The Anatomy of a Large-Scale Hypertextual Web Search Engine", http://dbpubs.stanford.edu:8090/pub/1998-8

File Shingling Systems

The growth of the Internet and affordable means of copying and distributing digital documents spurred research interest in technologies that can help detect illegal or inappropriate copies of documents. The primary application for this work was to detect the violation of copyright law, and to detect plagiarism. There is also significant interest in this problem as it relates to spam-email (AKA unsolicited commercial email) detection and automatic elimination. The technical term applied to describe most of these techniques is "file shingling" in which adjacent sequences of document fragments are reduced to "shingles" by hash codes, and then stored in a lookup table in the same sequence as they are found in the document.

File shingling provides a very quick way to look for similarity between two documents. In order to provide protection to a specific document (e.g., a text file) the document is shingled by hashing the document sentence-by-sentence and storing these hashed sentences in a table for quick lookup. In order to test a new document to see if it contains fragments of copyrighted content, the same hash function is applied to each fragment of the test message to see if the fragments appear in a similar order as they do in the copyrighted content. The technique is quick because the time required to lookup an individual fragment can be very fast.

The typical user interaction with a file shingling system is passive instead of active. File shingling systems are usually set up to process documents automatically and deliver the query results to a user asynchronously. A typical file shingling application might be spam prevention where a set of messages is used to create an index of restricted content that an organization does not want delivered to its email systems. In this scenario, the "query" is just the automatic processing of email messages and appropriate automatic routing.

With respect to document equivalency queries, for each test document t, find all documents d in our collection of indexed documents that have the same contents as t. For the case of spam detection, the set d could be all of the known active spam messages, and the document t could be an incoming email message.

With respect to cut-and-paste detection queries, for each test document t, find all documents d in our collection of indexed documents in which some fragment of d occurs in t. For the case of plagiarism detection, the set d could be all of the previously submitted essays for a particular class, and the document t could be a new paper written by a student who is suspected of plagiarism.

The main published research projects in file shingling are called KOALA, COPS, and SCAM. They all use variants on the basic file shingling approach described above with variants that optimize performance and accuracy. For information on KOALA, see N. Heintze, "Scalable Document Fingerprinting", Proceedings of Second USENIX Workshop on Electronic Commerce, November 1996. http://www.-2.cs.cmu.edu/afs/cs/user/nch/www/koala/main.html. For information on COPS, see S. Brin, J. Davis, and H. Garcia-Molina, "Copy Detection Mechanisms for Digital Documents", Proceedings of the ACM SIGMOD Annual Conference, May 1995. For information on SCAM, see N. Shivakumar and H. Garcia-Molina, "SCAM: A Copy Detection Mechanism for Digital Documents", Proceedings of 2nd International Conference in Theory and Practice of Digital Libraries (DL'95), June 1995, http://www-db.stanford.edu/~shiva/SCAM/scamInfo.html, and also see (by N. Shivakumar and H. Garcia-Molina), "Building a Scalable and Accurate Copy Detection Mechanism", Proceedings of 1st ACM Conference on Digital Libraries (DL'96) March 1996, http://www-db.stanford.edu/pub/papers/performance.ps.

Internet Content Filtering Systems

A variety of commercial applications, referred to as content filtering systems, implement protection measures. There are two major types of applications in this category: web site restriction/monitoring software, and email content control. In both cases, the main algorithm currently in use is pattern matching against a set of regular expressions for a set collection of text fragments that would indicate data misuse. An example might be to restrict all browsing at URLs that contain the text fragment "XXX". An example for the email content control category is stopping and blocking all email that contains the words "proprietary" and "confidential" but not the words "joke" or "kidding".

SUMMARY OF THE INVENTION

A method and apparatus for detecting pre-selected data stored on a personal computing device is described. In one embodiment, contents of data storage media of a personal computing device are searched for pre-selected sensitive data. In one embodiment, if at least a portion of the pre-selected sensitive data is detected, a notification of the detection of the pre-selected data is sent to a system via a network. In another embodiment, if at least a portion of pre-selected sensitive data is detected, the access to this data is blocked.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
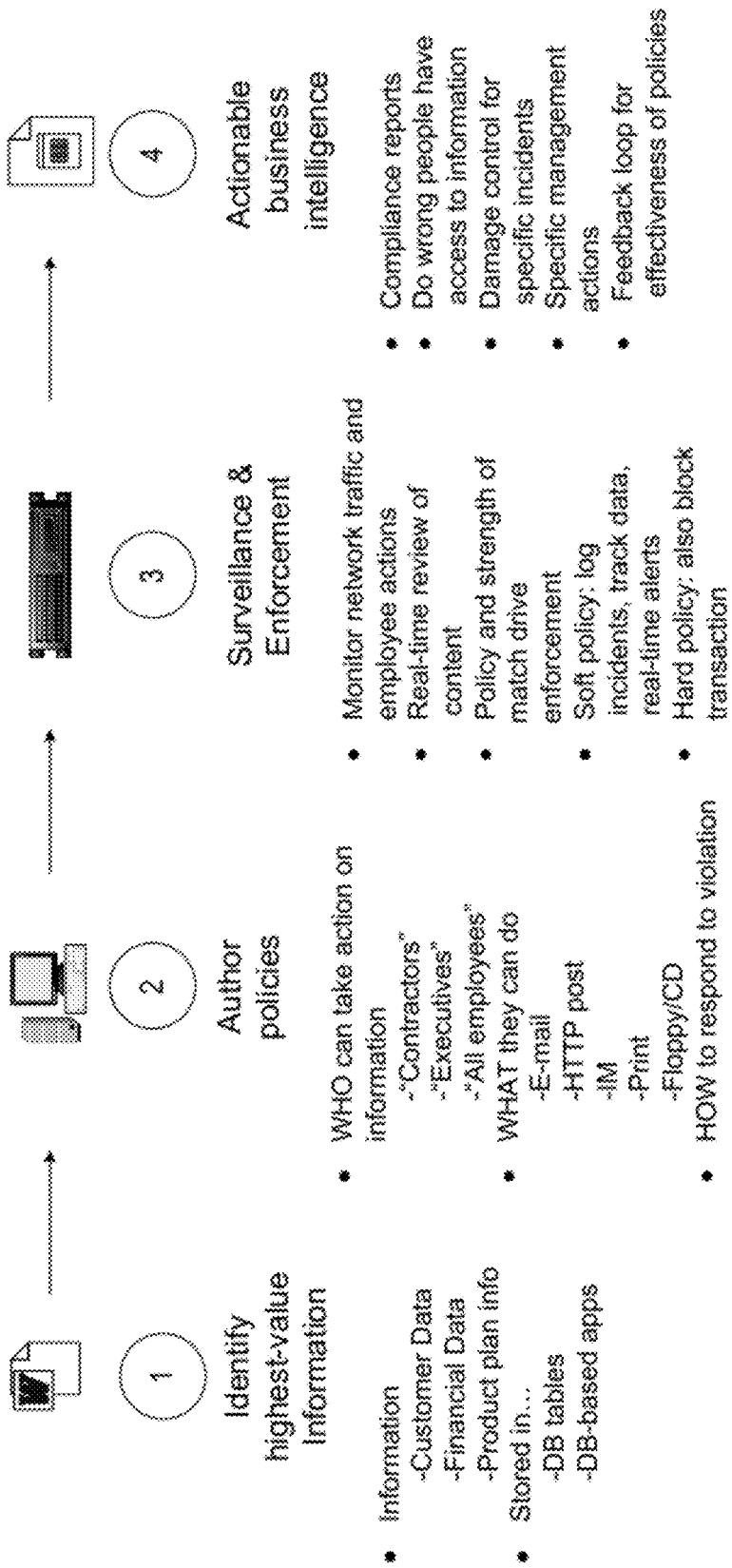
FIG. 1 illustrates one embodiment of a workflow.

A system and methodology is described herein to track and monitor the use of sensitive information anywhere on a personal computing device. In one embodiment, this monitoring is implemented by performing content searches of data storage media of a personal computing device such as a desktop computer or a portable computer. In another embodiment, the monitoring is implemented by performing content searches on messages as they are transmitted from or received by the personal computing device. In yet another embodiment, the monitoring is implemented by performing content searches before, during, and after the use of potentially sensitive information inside any application running on the personal computing device. In one embodiment, the system described herein is able to detect this information in a secure and scalable fashion that is capable of handling large amounts of the database data. Database data may comprise any form of tabular-formatted data stored in a variety of systems including, but not limited to, relational databases, spreadsheets, flat files, etc.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Components of an Exemplary Embodiment

In one embodiment, the system to perform the detection scheme described herein consists of two main components: a Policy Management System (PMS) and a Message Monitoring System (MMS). The PMS is responsible for accepting user input that determines information security policies for the use and transmission of data (e.g., database data) that is contained inside messages sent over the network or is stored in data storage media of the personal computing devices such as portable computers, desktop computers, Personal Digital Assistants, cell-phones, etc. This data is, thus, preselected. The term "data storage media of a personal computing device" as used herein refers to any storage within the personal computing device or accessible to the personal computing device that may store, temporarily or permanently, data for the personal computing device.

The MMS is responsible for performing content searches on messages sent over the network, data processed by personal computing devices, or data stored on data storage media of personal computing devices, and is responsible for implementing the policy identified to the PMS by the user. In one embodiment, both of these systems are coupled to a computer network that communicates any of the standard protocols for the exchange of information.

In the normal course of operation in this embodiment, a user may decide to implement a given policy that restricts the use or transmission of database data by certain individuals and then manually enters this policy into the PMS using a graphical-user-interface and one or more user input devices (e.g., a mouse, a keyboard, etc.). The user interface receives the input and may be running on a computer system with the PMS or on a separate machine. An example policy might be to stop a given group of individuals in customer service from saving a data file containing pre-selected data to a removable media device attached to a personal computing device. In one embodiment, the policy includes the nature of protection desired (e.g., restrict only a subset of employees), the type of data that requires protection (e.g., database data), and the network location (e.g., database table name, IP address of server, server or file name) of the database data that requires protection. Again, all of this information may be specified using a standard graphical user interface that prompts the user to enter the specific information in the correct fields.

At regular intervals, which in one embodiment are adjustable by the user but defaulting to once per specified interval (e.g., day), the PMS queries the database and extracts copies of the database data that is to be protected and derives from that data an abstract data structure (hereafter called the "index") that is described in more detail below.

The PMS then sends this index, along with the particulars on the policy that is to be implemented, to the MMS so that it can begin to enforce that policy. The MMS receives the index from the PMS together with the details on the policy to be enforced. The MMS uses the index and the policy information to enforce the policy specified by the user. In one embodiment, the MMS uses this index to search each of the outgoing messages (e.g., email messages, web mail messages, etc.) for the database data that is to be protected, as will be discussed in greater detail below. In another embodiment, the MMS uses this index to search contents of data storage media of a personal computing device and/or the content of interactions between the user and the personal computing device for the database data that is to be protected, as will be discussed in more detail below.

A summary of an exemplary workflow can be found in FIG. 1, where the highest-value information is identified, policies are authored, and surveillance and enforcement are performed, leading to actionable business intelligence.

Network-Based Modes of Operation

Figures 2A, 2B:
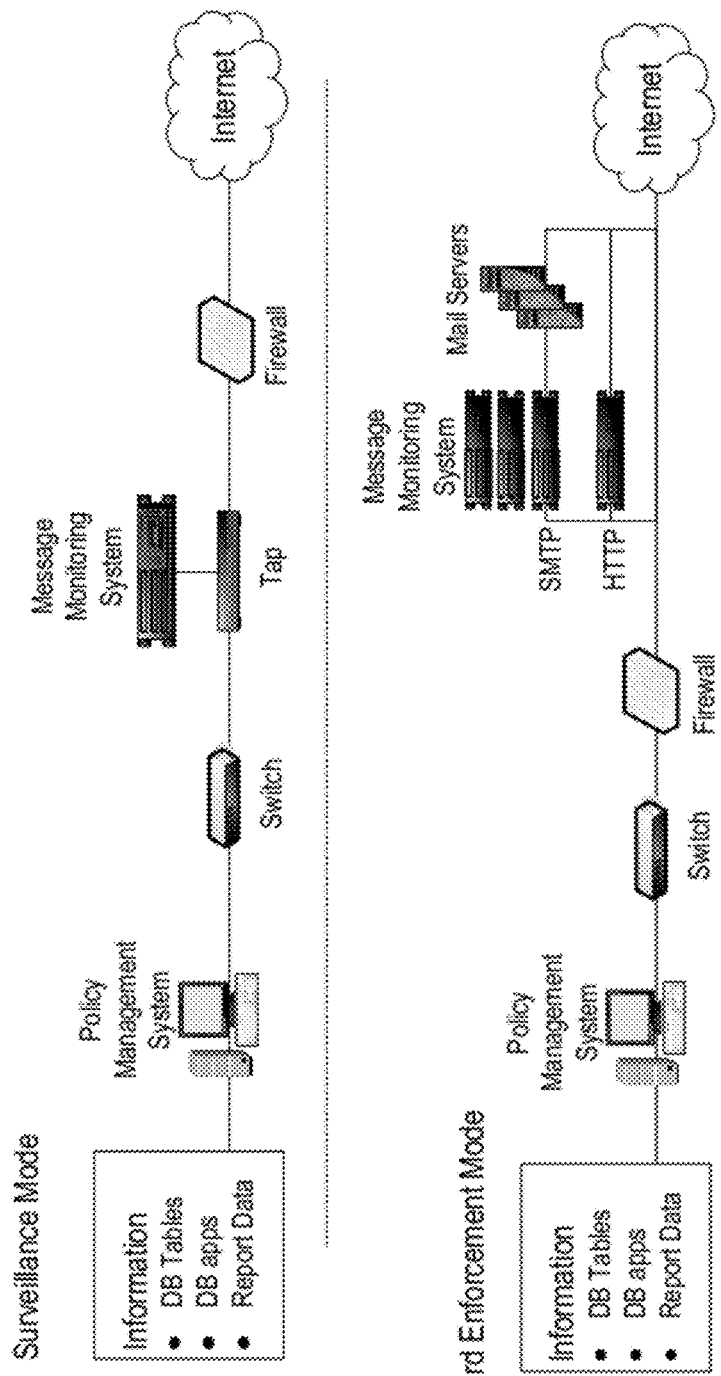
FIGS. 2A and 2B illustrate exemplary modes of operation.

In one embodiment, the Message Monitoring System can be configured in one of two ways: "surveillance mode", and "enforcement mode". FIG. 2 illustrates two network configurations. In surveillance mode, the MMS is placed somewhere on the network where it can watch traffic and report on violations of policy, but it is specifically not configured to block messages as they leave. This is shown in FIG. 2A where the PMS has access to information. The PMS is coupled to the Internet via a switch, a tap and a firewall. The MMS monitors the network messages using the tap. In "enforcement mode", the MMS is able to watch traffic and report on violations, but it can also intercept and re-route messages so that their ultimate destination is changed. This is shown in FIG. 2A where the PMS has access to information and is coupled to the Internet via a switch and a firewall. In this embodiment, the MMS monitors traffic using a series of servers and re-routes traffic to, for example, certain servers, if the MMS determines messages are likely to contain preselected information. The MMS may use different servers for each of the various layer protocols.

Message re-routing is not mandatory. Alternatively, the MMS can be configured to just intercept and stop the outgoing message. An example policy in "enforcement mode" would be to route all messages that violate a policy to the manager of the person that violates the policy so that appropriate disciplinary action can take place.

In both modes of operation, it is possible to install multiple MMSs, each with its own copy of the indices required to detect content. This parallel processing configuration helps with problems of scale and with protecting multiple possible points of egress of information.

In both configurations, the MMS is actively parsing messages that are transported using various application layer protocols (e.g., SMTP, HTTP, FTP, AIM, ICQ, SOAP, etc.).

In one embodiment, the two subsystems (PMS and MMS) run on one Local Area Network (LAN). However, the PMS and MMS may be incorporated into the same physical or logical system. This consolidated configuration is more appropriate for reasons of control cost of goods required to produce the system.

In yet another alternative embodiment, the PMS and MMS may not necessarily reside on the same LAN. The PMS may reside on the same LAN as the database information, but the MMS may reside on a different LAN that is separated from the LAN on which PMS resides. In this configuration, the two distinct LANs may ultimately be coupled together via the Internet but separated by firewalls, routers, and/or other network devices. This is an advantageous configuration for the case where a company wants to restrict another company that needs their database data (such as a law firm or marketing agency) from violating the first company's database data policy.

Figure 3:
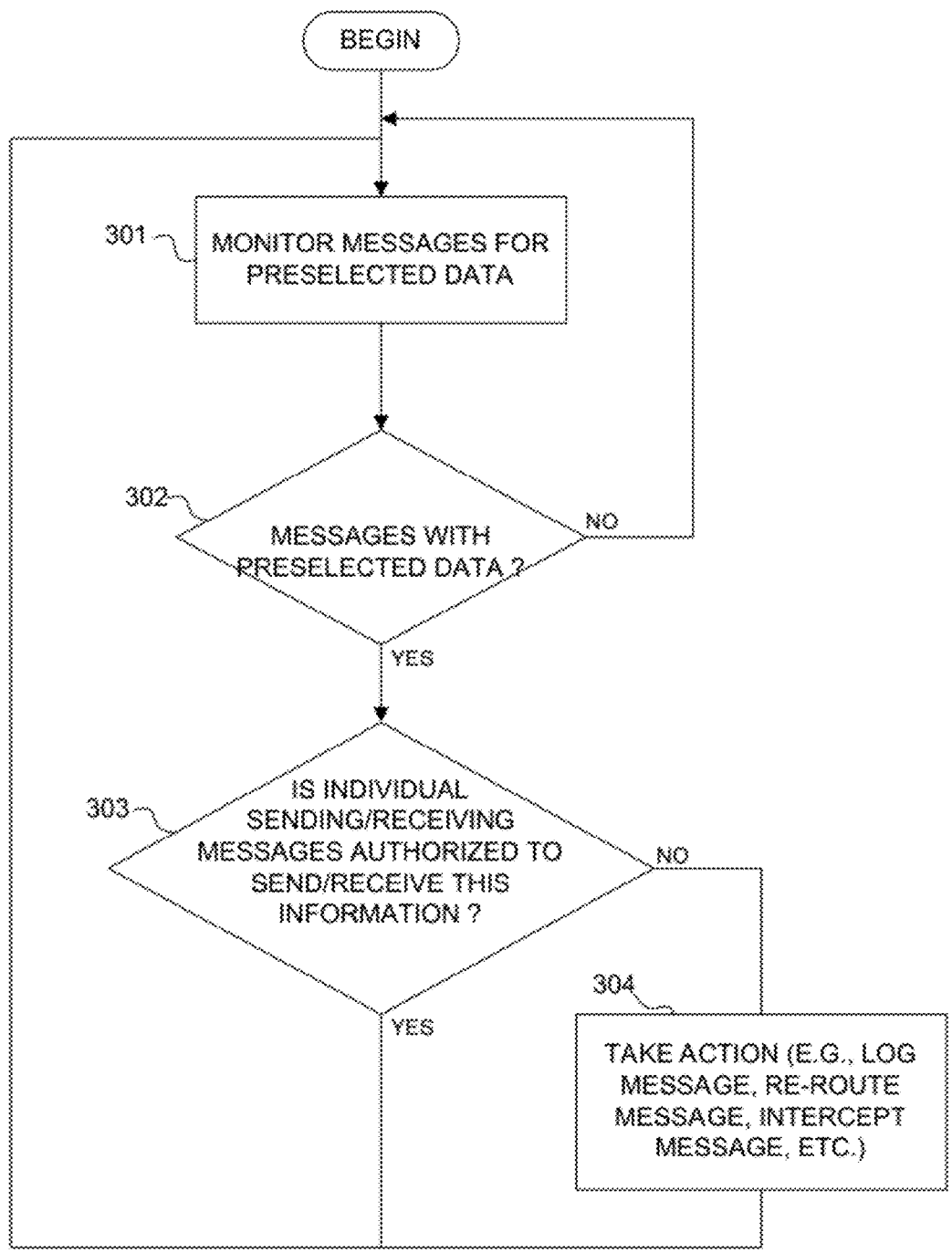
FIG. 3 is a flow diagram of one embodiment of a process for protecting database data.

FIG. 3 is a flow diagram of one embodiment of a process for protecting database data. The process is performed by processing logic that may comprise hardware (circuitry, dedicated logic, etc.), software (such as is run on a general purpose computer system or a dedicated machine), or a combination of both.

Referring to FIG. 3, processing logic monitors messages for pre-selected data (processing block 301). Next, processing logic determines whether a message has pre-selected data (processing block 302). If not, processing transitions to processing block 301. If so, processing logic determines if the individual sending/receiving message is authorized to send/receive the information in the message (processing block 303). If so, the process ends and processing transitions to processing block 301. If not, processing logic takes one or more actions such as intercepting the message, re-routing the message, logging the message, etc. (processing block 304) and processing transitions to processing block 301.

Client-Based Mode of Operation

The client-based mode of operation is directed to monitoring actions taken by a user of a personal computing device to detect user operations that may involve a potential misuse of data. These user operations may include, for example, saving or accessing restricted database data on any storage device on the computing system, using restricted database data in an application, printing restricted database data, using restricted database data in any network communication protocol, etc. In one embodiment, the monitoring of user actions is performed by parsing and searching the content that is either accessed or saved onto the local storage system of the personal computing device, or transported using various application layer protocols (e.g., SMTP, HTTP, FTP, AIM, ICQ, SOAP, etc.) In another embodiment, the monitoring of user actions is performed by intercepting and interpreting the data exchanged between the user and the personal computing device.

Figure 9:
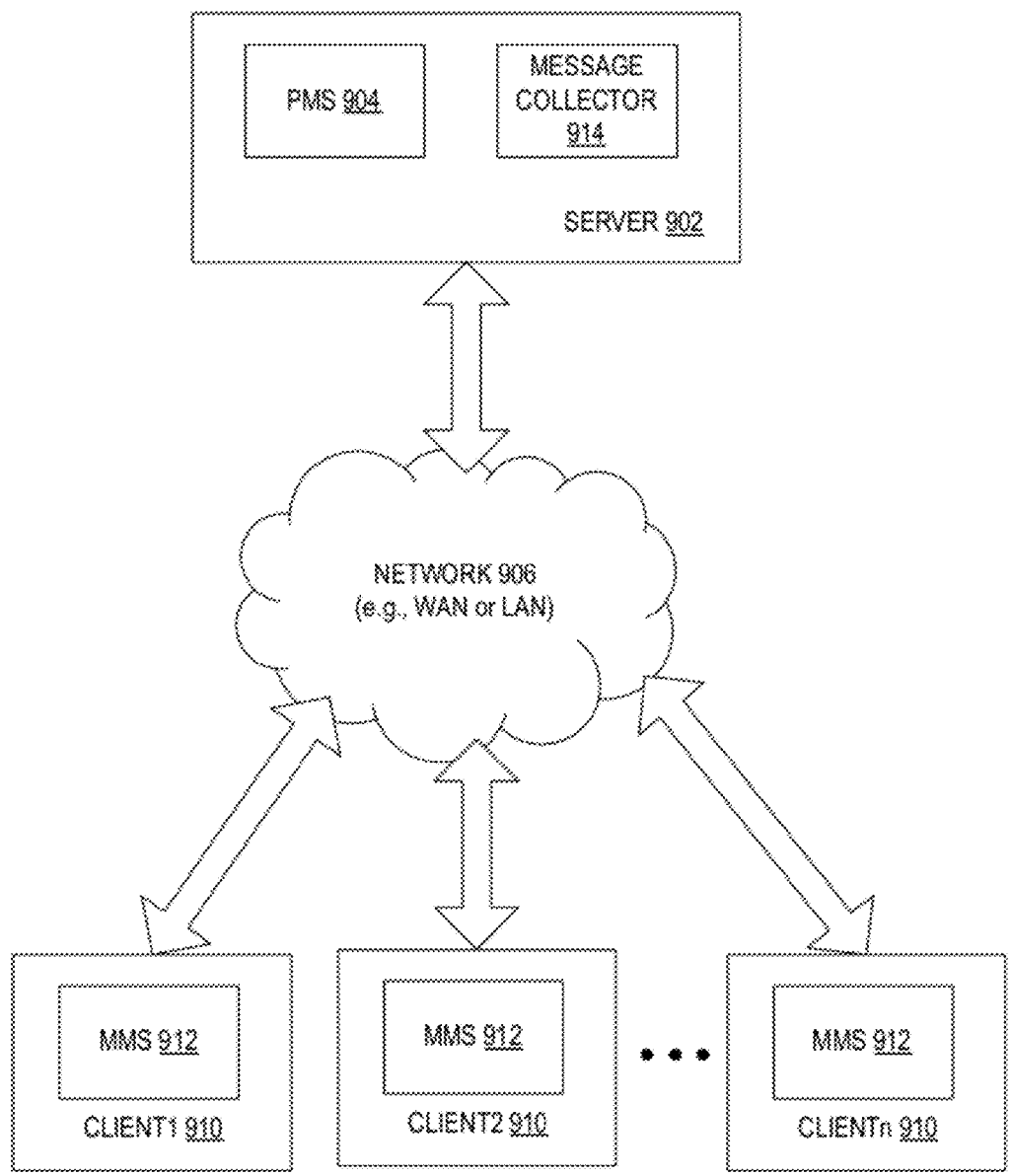
FIG. 9 is a block diagram of one embodiment of a system for client-based protection of pre-selected sensitive data.

FIG. 9 is a block diagram of one embodiment of a system for client-based protection of pre-selected sensitive data.

Referring to FIG. 9, a server 902 communicates with client computers (referred to as clients) 910 via a network 906. The network 906 may be a private network (e.g., a local area network (LAN)) or a public network (e.g., a wide area network (WAN)). The clients 910 are computers belonging to different employees within an organization. Each client 910 may be, for example, a desktop computer, a portable computer (e.g., a laptop), or any other computer that may operate with intermittent network connectivity. A content monitoring system (also referred to herein as message monitoring system or MMS) 912 resides on each client 912 and is responsible for searching contents of data storage media of this client for pre-selected sensitive data and for intercepting and interpreting content exchanged between the user and the client 912. The data storage media may include, for example, a main memory, a static memory, a mass storage memory (e.g., a hard disk), or any other storage device that may store, temporarily or permanently, files or other documents for the client computer. In one embodiment, the MMS 912 monitors specific data operations such as file-reads, file-writes, file-updates, and read and writes to removable media devices (e.g., floppy drives, universal serial bus (USB) devices, compact disk recordable (CDR) drives, etc.). The operation of the MMS 912 facilitates the prevention of sensitive data loss via removable and mobile devices. For example, the operation of the MMS 912 may prevent the escape of sensitive data that occurs if the user copies the sensitive data stored on the client 910 to a floppy disk, moves a file with the sensitive data to a USB-based removable memory device, prints or emails the sensitive data from the laptop or desktop computer, uses the sensitive data in an unauthorized application, etc.

The server 902 is responsible for configuring the detection scheme described herein within the organization. The server 902 contains a PMS 904 and a message collector 914. The PMS 904 maintains a set of security policies controlling the use of sensitive data. The set of security policies may identify employees whose computers need to be monitored for a potential misuse of sensitive data, specify the sensitive data for which searches are to be performed, and define the scope of the searches (e.g., specific storage medium, data operations, etc.). Based on this information, the PMS 904 instructs each MMS 912 as to whether a corresponding client 910 is to be searched and sends the index that is to be used for searching. The index is derived from the specific sensitive data that is pre-selected for one or more clients 912 based on the security policies. The message collector 914 is responsible for collecting messages received from the MMSes 912 that notify of data misuses by the users of the clients 910.

In one embodiment, each MMS 912 can operate in a stand-alone fashion when it cannot maintain network contact with the server 902 (e.g., if a laptop 910 is taken home for the weekend, moved to another network, stolen, etc.). For example, if the user disconnects the laptop 910 from the network 906, the MMS 912 running on the laptop 910 may perform periodic content searches of the data storage media of the laptop 910 while the user works on the laptop at home. Specifically, the MMS 912 may search the local file system of the laptop 910, an email message archive, etc. In addition, the MMS 912 may monitor specific data operations (e.g., file-reads, file-writes, file-updates, and reads and writes to removable media devices such as floppy drives) if instructed by the PMS 904. In one embodiment, when the MMS 912 detects the pre-selected data on any data storage medium of the client 910, it creates a message containing a notification of the detection of the pre-selected data, and places this message into a transmission queue. Subsequently, when the network connectivity is re-established, messages from the transmission queue are sent to the message collector 914. In one embodiment, the policies maintained by the PMS 904 require that MMS 912 prevent access to the pre-selected data once the pre-selected data is detected.

Figure 10:
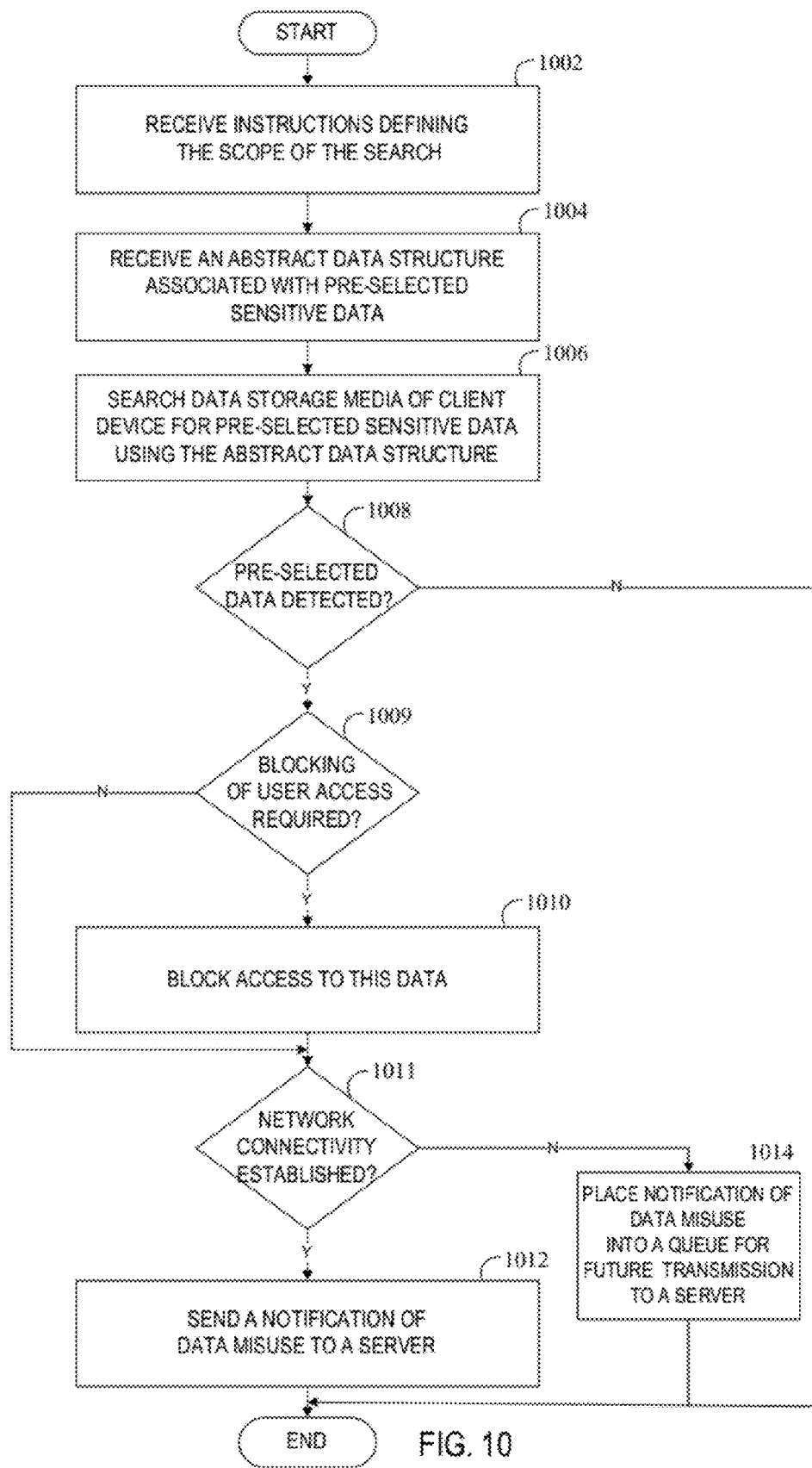
FIG. 10 is a flow diagram of one embodiment of a process for client-based protection of pre-selected sensitive data.

FIG. 10 is a flow diagram of one embodiment of a process for personal computing device-based protection of pre-selected sensitive data. The process is performed by processing logic that may comprise hardware (circuitry, dedicated logic, etc.), software (such as is run on a general purpose computer system or a dedicated machine), or a combination of both. Processing logic resides on a personal computing device such as a client 910.

Referring to FIG. 10, processing logic receives instructions defining the scope of content searches that are to be performed on the personal computing device (processing block 1002). In one embodiment, the instructions identify data storage media that are required to be searched and the periodicity of the search. In one embodiment, the instructions also identify the data operations that are to be monitored for the presence of pre-selected sensitive data.

Next, processing logic receives an abstract data structure or index derived from the pre-selected sensitive data (processing block 1004). Some embodiments of the abstract data structure are discussed in greater detail below.

At processing block 1006, processing logic searches the contents of the data storage media of the personal computing device for the pre-selected sensitive data using the abstract data structure. The scope of the content search is defined by the instructions received from the server. The searching may apply to contents of data storage media of this personal computing device data and/or content exchanged between the user and the personal computing device. In one embodiment, the content search is performed periodically, at predefined time intervals. Some embodiments of the searching technique used by processing logic are discussed in more detail below. The term "data storage media of a personal computing device" refers to any form of data storage accessible to the personal computing device including, for example, magnetic disks, volatile random access memory, removable media, tape backup systems, remote network addressable storage, etc. In one embodiment, processing logic searches volatile memory devices to detect use of pre-selected data by applications running on the personal computing device. Once the use is detected, processing logic identifies the application using the pre-selected data.

If processing logic detects the presence of the pre-selected data (or its portion) (processing box 1008), it then determines whether policies maintained by the PMS require blocking of access to the pre-selected data (processing box 1009). In one embodiment, the access to the detected data is blocked for the application attempting to access this data.

If blocking is required, processing logic blocks the access to the pre-selected data (processing block 1010) and further determines whether the personal computing device can maintain network contact with the server or any other designated device (processing box 1011). If this determination is positive, processing logic sends a message containing a notification of the detection to the server (processing block 1012). The notification may identify the personal computing device and the detected data. In one embodiment, the notification identifies the application that was using the pre-selected data when running on the personal computing device.

If there is no connection between the personal computing device and the server, processing logic places this message into a queue for future transmission to the server when the network connectivity is re-established (processing block 1014).

As discussed above, the personal computing device-based monitoring allows for surveillance of content stored on and processed by a personal computing device. As opposed to existing desktop-based firewalls that perform filtering based on a protocol, the content searching described herein addresses the problem of specifically searching for traces of pre-selected database data inside a file-system, memory bank, or data in the process of being accessed by an application.

With respect to the access control technique that prohibits unauthorized access by prompting the requestor for credentials (e.g., a password), the client-based protection of sensitive data that is described herein monitors content stored in the personal computing device after this content has been downloaded or otherwise accessed through an access control system.

Desktop-based encryption/decryption packages systems, which typically rely on server-based mechanisms to encrypt the data and desktop-based mechanisms to decrypt it for viewing, help prevent the misuse of data by restricting the access to the cryptographic keys that decrypt the data. The client-based protection of sensitive data that is described herein can be used to protect the data that is left "in the clear" outside of a cryptographic envelope and is, therefore, vulnerable to theft by third parties.

As to the anti-viral solutions that are typically used to detect the presence of hostile hidden code inside attachments, the client-based protection of sensitive data that is described herein is directed to detecting the presence of pre-selected database data, and not the presence of the hidden code.

With respect to driver-filters, which are forms of software written to drive the operation of hardware using a content filter that monitors all content sent to that personal computing device, they lack the ability to perform searches of data storage media of the personal computing device for pre-selected database data.

Security Requirements for One or More System Embodiments

Since the embodiments of the detection system are used to enforce information security policies, the security properties of this system are paramount. In one embodiment, the chief objective of this system is to enforce security policies that are pertinent to database data. This implies that the system must be very secure in the manner in which it handles database data. If, in the process of protecting the database data, the system opens up new avenues to steal database data, then its ultimate purpose is defeated.

In one embodiment, the MMS is deployed in such a way as to monitor and/or block the largest number of messages flowing through the network. This means installing the MMS at various points in the network where traffic is concentrated (e.g., routers, mail systems, firewalls, desktop computers, email archive systems, etc.) This means that the MMS may be installed either behind or in front-of one of these points of concentration on the network. Such placement of the system affords it an exceptional view of message and increases its utility for the organization using the system. Unfortunately, such placement also makes the MMS highly vulnerable to network-based attacks (commonly called "hacking") in which a third party uses unauthorized network access to violate the security perimeter surrounding the network to steal the data contained inside the network. Such placement makes MMS vulnerable to "hacking" attacks by the same employees who are being monitored by the MMS.

In another embodiment, the MMS is deployed locally on a personal computing device and is responsible for performing surveillance on the use of local storage media, on the use of classified data by applications running on the personal computing device, and on network communications to and from the device. Such placement of the system affords it an exceptional view of the information accessed and used by the person operating the computing device and increases its utility for the organization using the system. However, such placement makes the MMS vulnerable to "hacking" attacks by the same employees who are being monitored by the MMS.

The PMS's security concerns are also high in that its software directly queries the information sources in order to build the index that the MMS utilizes.

Hence, the placement of the MMS on the network, in one embodiment, or on a personal computing device, in another embodiment, makes it exposed to attacks. These attacks can come, in one embodiment, from inside the Local Area Network (LAN) or from outside the LAN via the WAN and/or Internet link that the organization maintains. In another embodiment, the attacks can come from users of a personal computing device. The specific security concern here is that the MMS may contain valuable database data from the relational database that it is trying to protect. The concern is that hackers or users of personal computing devices may try to steal the data from the MMS instead of trying to steal it from the more-thoroughly guarded computer on which the relational database actually runs.

A second and related security concern for the application arises in the case when the MMS is deployed at a different LAN from that in which the PMS is deployed. As mentioned above, this may be an important configuration to help implement security policy across two organizations that share database data. Here again, the information stored in the MMS is subjected to information security threats.

Various embodiments treat these security threats directly. One aspect of novelty of these embodiments described herein is that the PMS/MMS pair that exchanges indices that contain no copies of the data that it is seeking to protect. As covered above, the PMS sends abstract data structures derived from the database data to the MMS so that it can enforce policy. One possible approach to achieve this protection is to simply copy the database into the MMS, or (equivalently from a security perspective) allow the MMS to directly query the database in order to check that the content is consistent with policy. The problem with this approach is that it introduces significant security vulnerabilities where there were none before. In this insecure approach, the cure is worse than the disease.

In one embodiment, the PMS creates an index from the database that contains no copies of the database data, or contains only encrypted or hashed copies of database data. Such an index may be created using a tuple-storage mechanism that provides a data structure for storing multiple tuples associated with fragments of the database data. Examples of the tuple-storage mechanism include a hash table, a vector, an array, a tree, a list, or a table in a relational database management system. In the process described below, the data stored in the indices only retains the relative placement of the elements in the database in relation to other elements. For example, in the case of a hash table, the index may store, for each fragment of the database data (e.g., a data fragment inside a database cell), the fragment's hash code together with its row number, column number and type of the column.

Other embodiments of this same solution utilize indices that contain fragments of the intellectual property that is under protection, thus reducing the value of the solution by exposing that information to security threats. In one embodiment, the techniques described herein specifically avoid storing any representation of the data itself so that, in the case of a hacker breaking into the host that runs the MMS; the data that is exposed to theft is inconsequential.

An alternate embodiment to that described by the process given below could be done to enhance performance. In this alternate embodiment, copies of only a small amount of frequently used strings and numbers from the database that represent a large proportion of the data in the system is still stored directly in the index along with the rest of the information on relative placement of data in the database table(s). This is done by storing copies of these common strings themselves, instead of hash codes. In this alternate approach, the system stores (for these common terms) the row numbers, column numbers, and type of the database data, but now instead of storing a hash code it stores the string itself. For the rest of the cells of the database that are not quite so common, only the row numbers, column numbers, and type of the database data are stored while specifically not storing copies of these strings. This approach uses the fact that the statistical distribution of string and numeric data in databases is often skewed so that the most common terms account for a very large percentage of the overall volume of data stored. Storing these common terms in a separate index helps index query efficiency since the small number of common terms accounts for a large proportion of the queries, and these queries can be run using standard quick techniques from the literature (e.g., hash table lookups, bitmaps, etc.). The reason that this is not a security vulnerability is that this small number of terms that account for a disproportionate share of volume of database data are the least valuable pieces of data. The terms "John" and "Smith" are very common inside databases that contain names, but the theft of these terms is relatively worthless. In this embodiment, the system is still carefully avoiding storing copies of data of less-common terms of higher value (e.g., credit card numbers, SSN, uncommon names, etc.). In this embodiment, as in the previously abovementioned embodiment, the system avoids storing any copies of sensitive information by storing only hash codes and tuples of information related to the placement of cells in the database.

Detection of Preselected Data

In one embodiment, the process of preselected data detection includes two major operations, or phases: indexing, and searching. In the indexing phase, the system builds indices from the preselected data. The preselected data may be any data whose relations allow it to be structured in a tabular format. In other words, the preselected data may be stored in a tabular format (e.g., data in a relational database, data in an Excel spreadsheet, etc.) or it may be stored in a non-tabular format but have such relationships as to allow it to be stored in a tabular format (e.g., data stored as comma separated values in a flat file or a password database, relational data in an object-oriented database, etc.).

Figure 4:
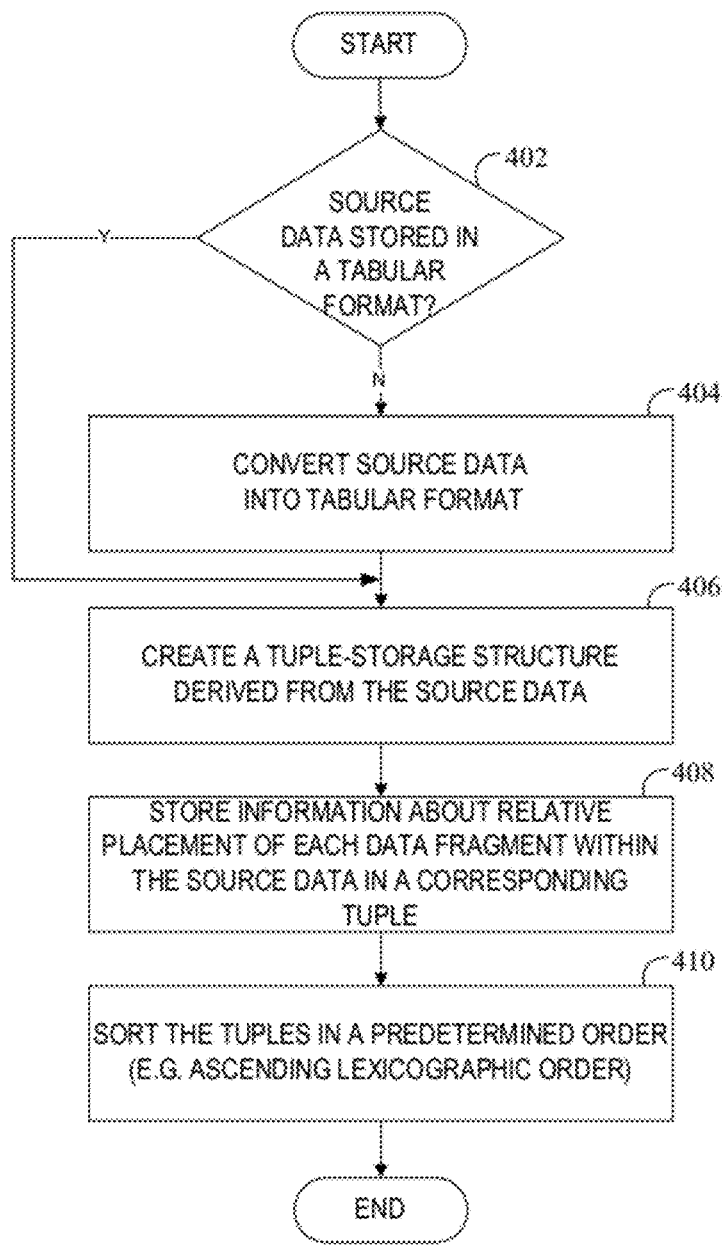
FIG. 4 is a flow diagram of one embodiment of a process for indexing database data.

FIG. 4 is a flow diagram of one embodiment of a process for indexing the preselected data. The process is performed by processing logic that may comprise hardware (circuitry, dedicated logic, etc.), software (such as is run on a general purpose computer system or a dedicated machine), or a combination of both.

Referring to FIG. 4, processing logic begins with determining whether the preselected data is stored in a standard tabular format (processing box 402). If not, processing logic converts the preselected data into a standard tabular format (processing block 404). Each cell in the resulting table stores a fragment of the preselected data. In one embodiment, each data fragment is a token. A token may be a single word or a cluster of words (e.g., words enclosed in quotation marks). For example, while the word "this" may represent a token stored in a database cell, the phrase "this token" may also represent a standalone token if it is stored as a single string in a database cell.

Next, processing logic creates a tuple-storage structure derived from the preselected data (processing block 406). A tuple-storage structure provides a mechanism for storing multiple tuples associated with the fragments of the preselected data. Examples of tuple-storage structures include a hash table, a vector, an array, a tree or a list. Each type of the tuple-storage structure is associated with a method for retrieving a set of tuples for any given content fragment (the set of tuples may be empty if no match is found in the tuple-storage structure).

Further, processing logic stores information about the position of each data fragment within the database in a corresponding tuple (processing block 408). In one embodiment, the information about the position of a data fragment includes the number of a row storing the data fragment in the database. In another embodiment, this information also includes the number of a column storing the data fragment in the database and optionally the data type of the column.

Afterwards, processing logic sorts the tuples in a predetermined order (e.g., in the ascending lexicographic order) (processing block 410).

Thus, the resulting abstract data structure (i.e., the index) only contains information about the relative placement of data records in the context of the larger whole but does not include any fragments of the preselected data itself.

In one embodiment, the contents of the index are treated cryptographically (e.g., with a hash function or using an encryption function with a cryptographic key) to further secure the index from theft.

Figure 5:
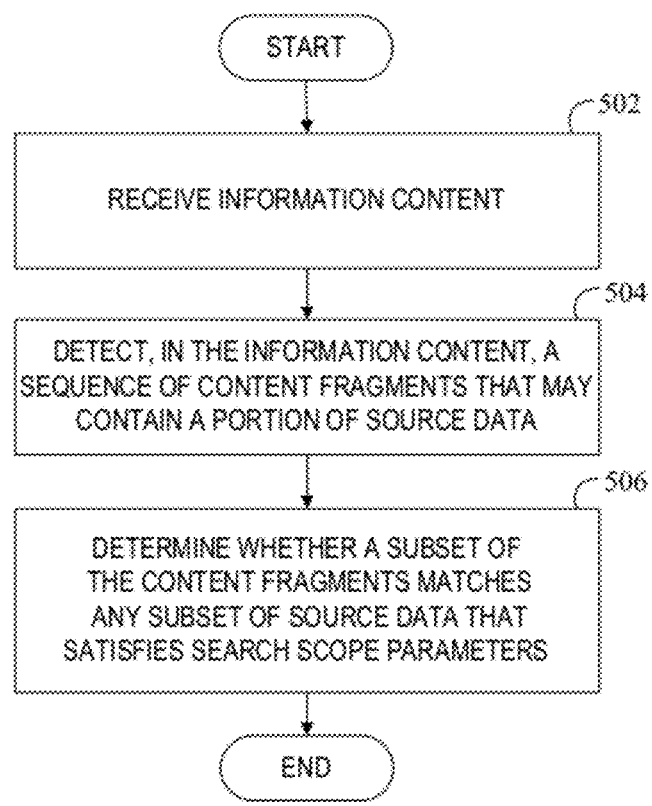
FIG. 5 is a flow diagram of one embodiment of a process for searching information content for preselected data.

The "searching" phase of the preselected data detection process will now be discussed in more detail. FIG. 5 is a flow diagram of one embodiment of a process for searching information content for preselected data. The process is performed by processing logic that may comprise hardware (circuitry, dedicated logic, etc.), software (such as is run on a general purpose computer system or a dedicated machine), or a combination of both.

Referring to FIG. 5, processing logic begins with receiving information content (processing block 502). The information content may be included in a file (e.g., an archived email message stored on a hard drive of a computer) or in a block of data transmitted over a network (e.g., an email message transmitted over a network using any type of a network protocol).

Next, processing logic detects in the information content a sequence of content fragments that may possibly contain a portion of preselected data (processing block 504). As discussed above, the preselected data may be proprietary database data that needs to be protected or any other kind of data that has an inherent tabular structure. That is, the preselected data may either be stored in a tabular format (e.g., data in a relational database, data in an Excel spreadsheet, etc.) or it may be stored in a non-tabular format but have such relations as to allow it to be stored in a tabular format (e.g., data stored as comma separated values in a flat files or a password database, relational data in an object-oriented database, etc.).

In one embodiment, the detected sequence of content fragments is a set of adjacent tokens within the information content. Each token may correspond to either a word or a phrase. The detected sequence of content fragments may be a portion of the received information content or the entire information content.

In one embodiment, processing logic decides that a sequence of content fragments may possibly contain a portion of the preselected data upon determining that the sequence of content fragments resembles column-formatted data. This determination may be made by parsing the received information content to identify separated lines (as may be indicated, for example, by tags <cr> or <cr> <lf>) and finding that these separated lines contain a similar number of tokens and optionally the similar data types of the tokens.

In another embodiment, processing logic decides that a sequence of content fragments may possibly contain a portion of the preselected data upon parsing the entire information content and searching blocks of contiguous tokens for preselected data. In one embodiment, the blocks of contiguous tokens are defined based on user-specified parameters such as a user-specified width of each block and a user-specified position of each block within the information content (e.g., the user may require that the two adjacent blocks be separated by a certain number of tokens).

In yet another embodiment, processing logic decides that a sequence of content fragments may possibly contain a portion of the preselected data upon finding in the information content an expression of a predefined format. Such expression may be, for example, an account number, a social security number, a credit card number, a phone number, a postal code, an email address, text formatting indicating a monetary or numeric value (e.g., "$" signs together with digits), etc. Once the expression is found, processing logic decides that a region of text surrounding the expression may possibly contain a portion of the preselected data. The size of this region may be defined by a predetermined number of tokens on each side of the found expression.

In yet another embodiment, processing logic decides that a sequence of content fragments may possibly contain a portion of the preselected data upon determining that the word usage or the word distribution in the information content (or in some portion of the information content) resembles a statistical pattern that indicates a possible containment of the preselected data in the information content.

In still another embodiment, processing logic decides that a sequence of content fragments may possibly contain a portion of the preselected data upon determining that certain properties associated with the received information content indicate a possible containment of the preselected data in the information content based on the history of previous violations. These properties may include, for example, the destination of the information content (e.g., a recipient of an electronic message), the origin of the information content, the time of transmission associated with the information content, the size of transmission associated with the information content, the types of files contained in the transmission (e.g., multipurpose Internet mail extension (MIME) types of files), etc. In one embodiment, the history of previous violations is maintained by identifying, for each detection of preselected data, the properties of the information content in which the preselected data was detected and recording these properties in a previous violation database. Subsequently, when processing logic decides whether a sequence of content fragments within the new information content may possibly contain a portion of preselected data, processing logic identifies the properties of the new information content and searches the previous violation database for these properties. If a match is found, processing logic determines whether the previous violations associated with the matching property indicate a possible containment of preselected data in the new information content. This indication may be based on the number of previous violations associated with the matching property or the frequency of previous violations associated with the matching property. For example, this indication may be based upon the total number of violations that a particular sender has committed, or the frequency of those violations over a given time period.

Afterwards, upon detecting a sequence of content fragments that may possibly contain a portion of the preselected data, processing logic makes a determination as to whether any subset of these content fragments matches a subset of the preselected data (processing block 506). This determination is made using an index (also referred to herein as an abstract data structure) that defines the tabular structure of the preselected data.

Figure 6A:
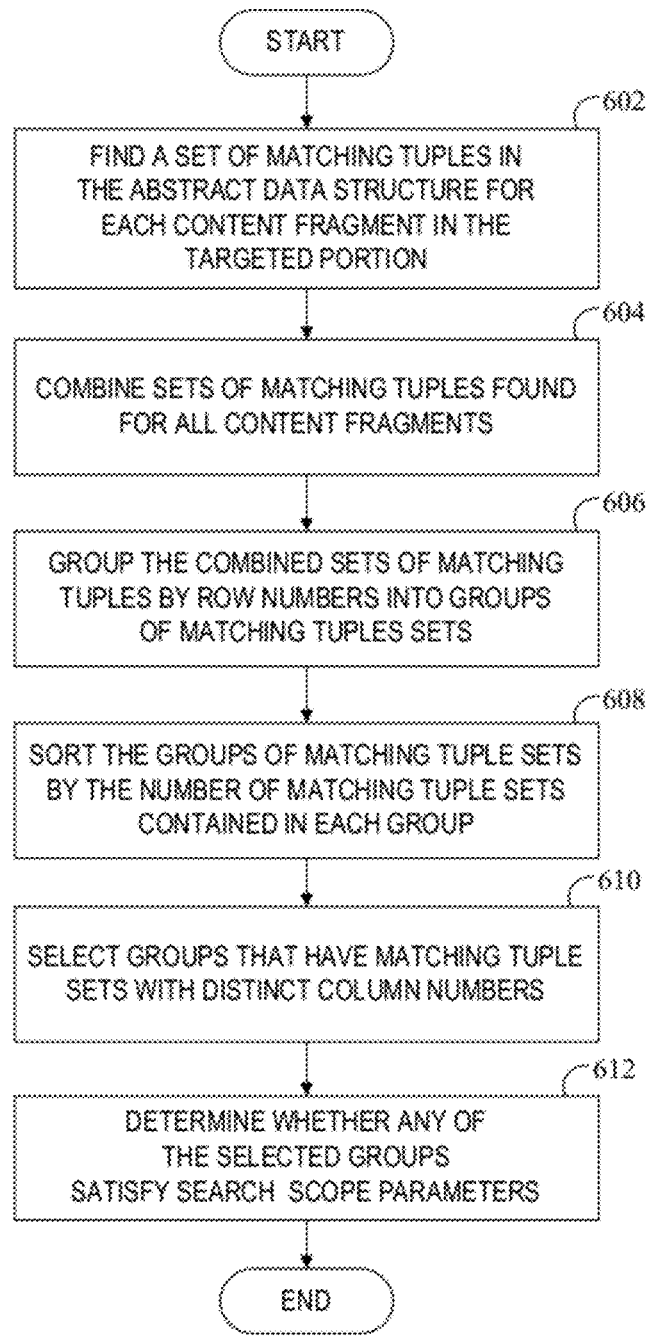
FIG. 6A-6B are flow diagrams of one embodiment of a process for finding a match for a subset of content fragments in an abstract data structure derived from preselected data.
Figure 6B:
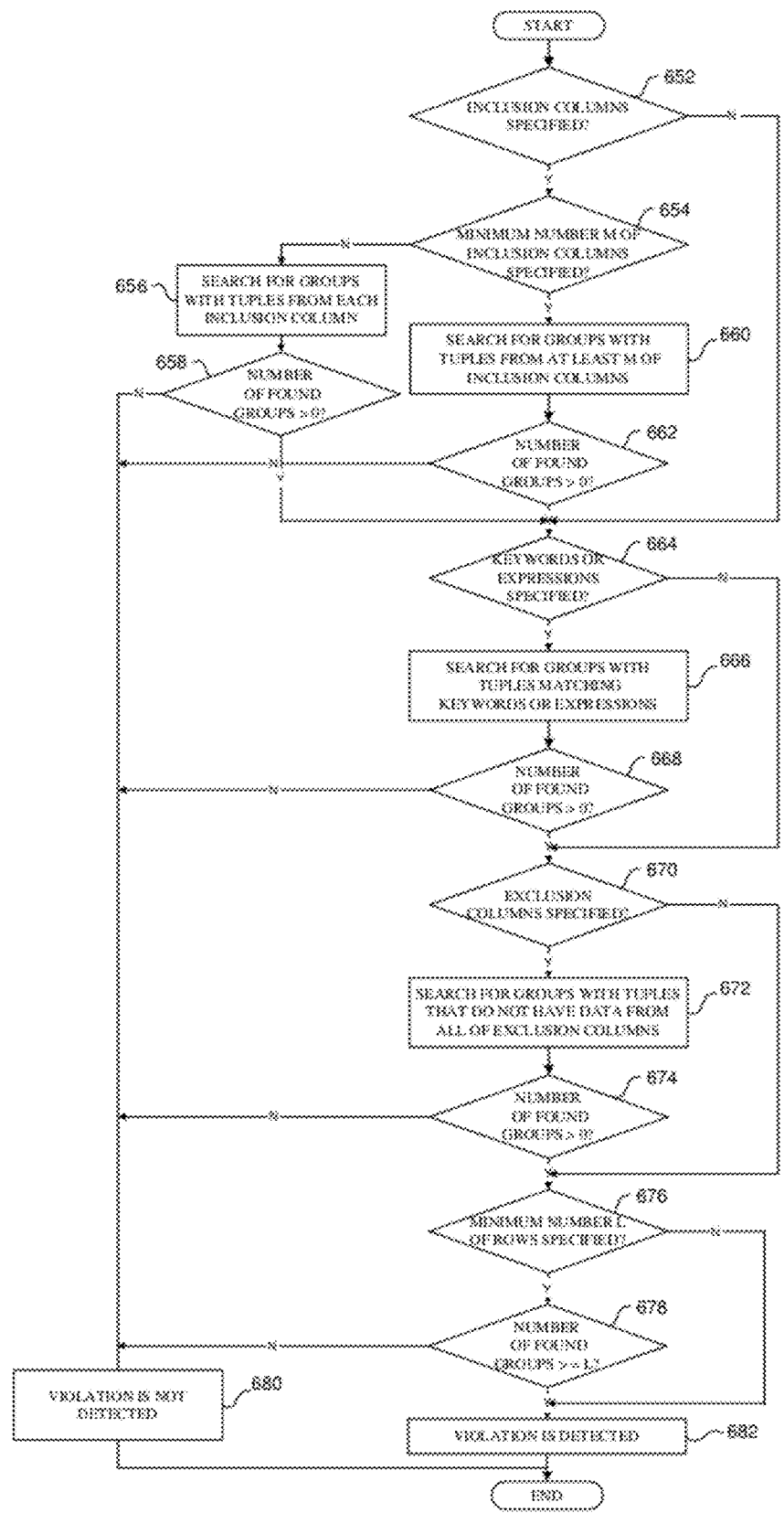

FIG. 6 is a flow diagram of one embodiment of a process for finding a match for a subset of content fragments in an abstract data structure derived from preselected data. The process is performed by processing logic that may comprise hardware (circuitry, dedicated logic, etc.), software (such as is run on a general purpose computer system or a dedicated machine), or a combination of both.

Referring to FIG. 6, processing logic begins with parsing the sequence of content fragments identified at processing block 504 of FIG. 5 into content fragments (e.g., tokens). Then, for each content fragment, processing logic searches the abstract data structure for a set of matching tuples (processing block 602). For example, a word "Smith" contained in the information content may have several occurrences in the preselected data that are reflected in the abstract data structure. Specifically, each of these occurrences has a corresponding tuple in the abstract data structure. During the search, processing logic retrieves a set of tuples corresponding to the occurrences of the word "Smith" in the preselected data. Each tuple stores information about the position of this data fragment within a database or a table storing the preselected data. In one embodiment, the positional information includes the row number of a cell storing the data fragment. In another embodiment, the positional information also includes a column number of this cell and optionally the data type of the column.

Next, processing logic combines the matching tuple sets found for all the content fragments (processing block 604) and then groups the combined matching tuple sets by row numbers into groups L (processing block 606). As a result, each group L (referred to herein as an accumulator) contains matching tuple sets that all have the same column number, i.e., the matching tuple sets in each group L correspond to fragments of the preselected data that all appear to be from the same row in the database.

Further, processing logic sorts the groups L by the number of matching tuple sets contained in each group (processing block 608) and, in one embodiment, selects those groups that have tuple sets with distinct column numbers (processing block 610). Afterwards, processing logic determines whether any of the selected groups has a sufficiently large number of matching tuple sets (processing block 612). For example, if the number of matching tuple sets in one group exceeds "3", then there is a high likelihood that the information content does include data from four or more columns of the same row in the database.

Figure 7A:
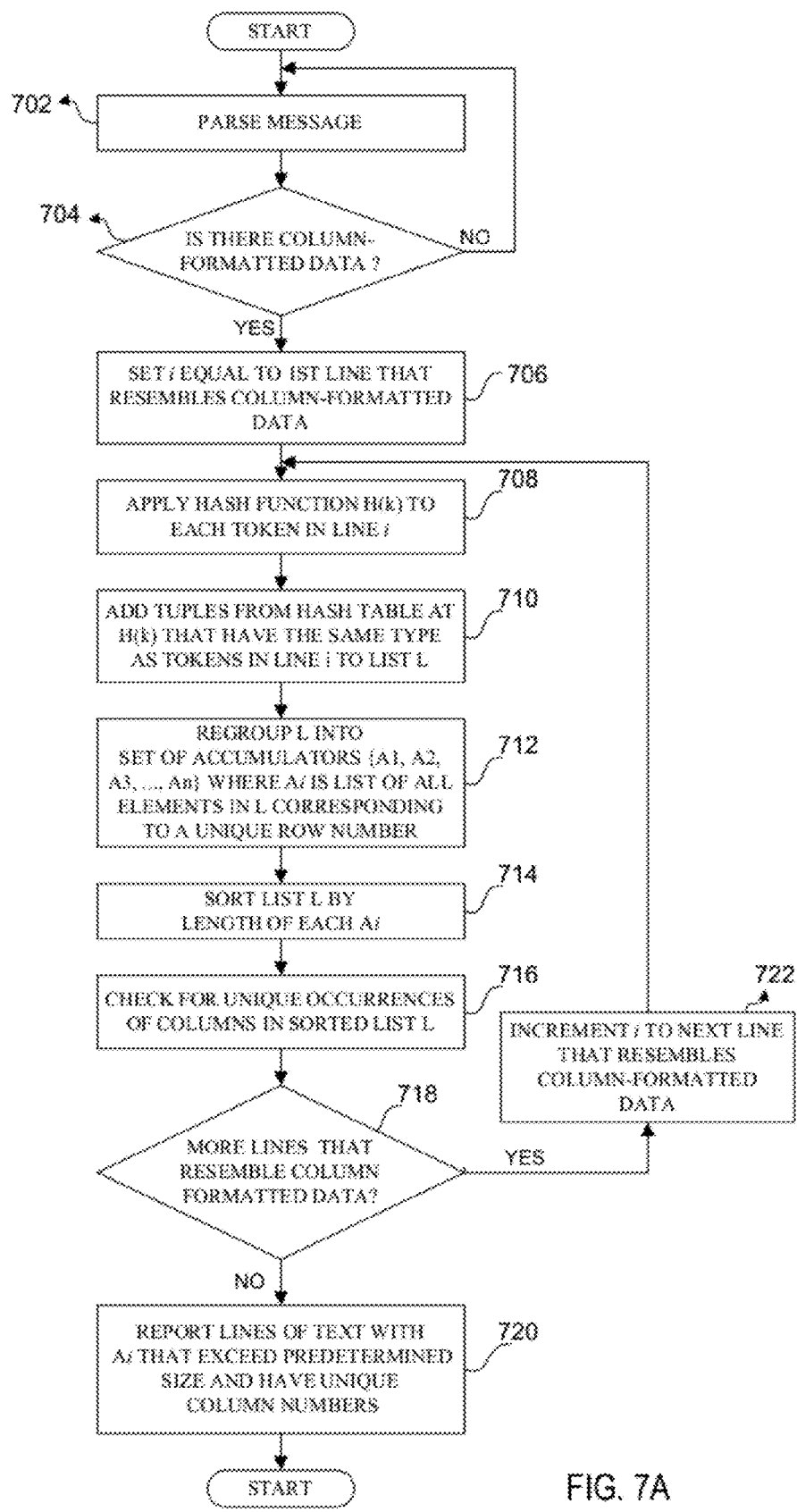
FIGS. 7A-7C are flow diagrams of alternate embodiments of a process for searching an incoming message using a hash table index of preselected data.
Figure 7B:
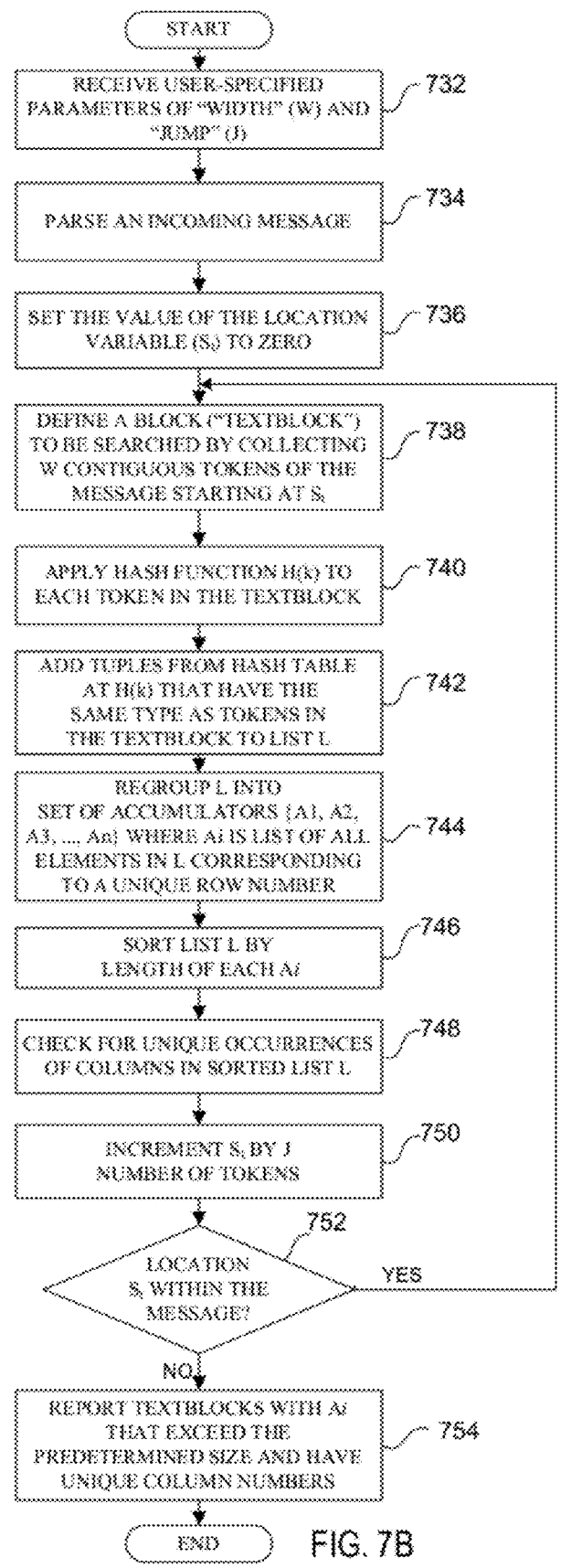
Figure 7C:
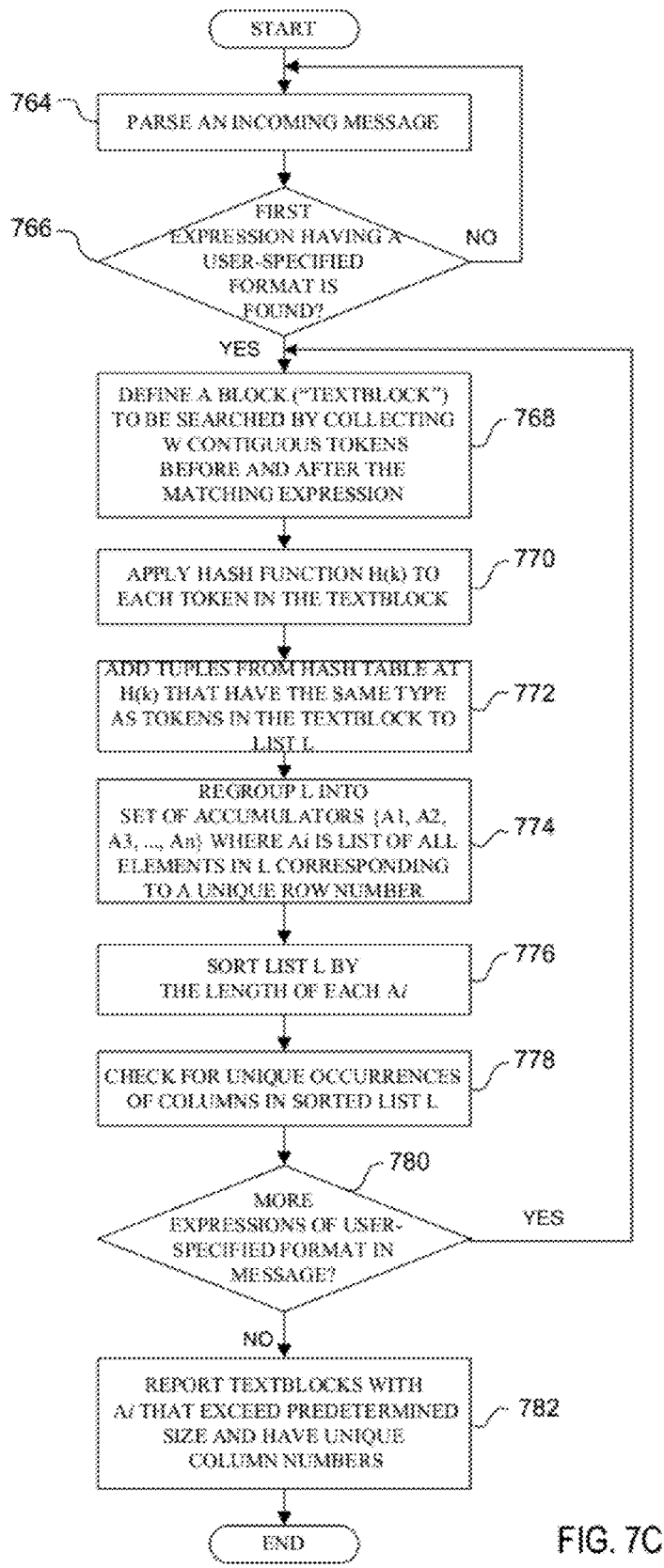

Exemplary embodiments of a search process will now be described. FIGS. 7A-7C are flow diagrams of alternate embodiments of a process for searching an incoming message using a hash table index of preselected data. The process is performed by processing logic that may comprise hardware (circuitry, dedicated logic, etc.), software (such as is run on a general purpose computer system or a dedicated machine), or a combination of both.

Referring to FIG. 7A, processing logic begins with parsing an incoming message (processing block 702). Next, processing logic determines whether the parsed portions of the incoming message contain column-formatted data (processing box 704). In one embodiment, lexical analysis may be used to identify lines in the parsed portions of the incoming message (e.g., by finding tags <cr> or <cr><lf> that are used to separate lines) and then detecting that the number of tokens found in adjacent lines is identical in number and in type. In one embodiment, processing logic stores the type of each token, along with the total number of tokens.

If the determination made at processing box 704 is negative, processing transitions to processing block 702. Otherwise, processing transitions to processing block 706 where processing logic sets i equal to the first line that resembles column-formatted data.

Next, processing logic applies a hash function H(k) to each token in line i (processing block 708), finds a set of tuples at H(k) in the hash table for each token in line i, adds the tuples to list L, and regroups list L into a set of accumulators (processing block 712) in which each individual accumulator's tuples have the same row number value. Further, processing logic sorts that list L by the length of each Ai (processing block 714) and checks for unique occurrences of columns in sorted list L (processing block 716). At processing block 710, optional pre-processing logic may be performed to filter the tokens before insertion into list L so that only those tuples with type matching the lexical type of the original token k are added to L. It should be noted that in some other embodiments checking for unique occurrences of columns may be skipped for reasons of speed or simplicity. In yet other embodiments, tuples are simple "singletons" containing row numbers only (i.e., no column number and no type indicator.)

Afterwards, if the incoming message contains more lines that resemble column-formatted data (processing box 718), processing logic increments i to the next line that resembles column-formatted data (processing block 722) and the process transitions to processing block 706. Otherwise, processing logic reports lines of text with Ai that exceed the predetermined size and have unique column numbers (processing block 720).

Referring to FIG. 7B, processing logic begins with receiving user-specified parameters of "width" (W) and "jump" (J) (processing block 732) and parsing an incoming message (processing block 734). Parameter W specifies the number of contiguous tokens in each block of contiguous tokens that is to be searched during a single iteration and parameter J specifies the required number of tokens between the two adjacent blocks.

Next, processing logic sets the value of the location variable ($S_t$) to zero (processing block 736) and defines a block ("textblock") to be searched by collecting W contiguous tokens of the message starting at $S_t$ (processing block 738).

Further, processing logic applies a hash function H(k) to each token in the textblock (processing block 740), finds a set of tuples at H(k) in the hash table for each token in the textblock, adds the tuples that have the same type as the corresponding tokens in the textblock to list L (processing block 742), regroups list L into a set of accumulators (processing block 744), sorts that list L by the length of each Ai (processing block 746) and checks for unique occurrences of columns in sorted list L (processing block 748).

Afterwards, processing logic increments $S_t$ by J number of tokens (processing block 750) and determines whether location $S_t$ is still within the message (processing box 752). If the determination is positive, the process transitions to processing block 738. Otherwise, processing logic reports textblocks with Ai that exceed the predetermined size and have unique column numbers (processing block 754).

Referring to FIG. 7C, processing logic begins with parsing an incoming message (processing block 764) and looking for a first expression having a user-specified format (processing block 766). Such expression may be, for example, an account number, a social security number, a credit card number, text formatting indicating a monetary or numeric value (e.g., "$" signs together with digits), etc. If the matching expression is not found, the process transitions to processing block 764. Otherwise, the process transitions to processing block 768 where processing logic defines a block ("textblock") to be searched by collecting W contiguous tokens before and after the matching expression. For example, the textblock may consist of 10 tokens immediately preceding the matching expression, the matching expression itself and 10 tokens immediately following the matching expression.

Further, processing logic applies a hash function H(k) to each token in the textblock (processing block 770), finds a set of tuples at H(k) in the hash table for each token in the textblock, adds the tuples that have the same type as the corresponding tokens in the textblock to list L (processing block 772), regroups list L into a set of accumulators (processing block 774), sorts that list L by the length of each Ai (processing block 776) and checks for unique occurrences of columns in sorted list L (processing block 778).

Afterwards, processing logic determines whether the message has anymore expressions of the user-specified format (processing box 780). If this determination is positive, the process transitions to processing block 768. Otherwise, processing logic reports textblocks with Ai that exceed the predetermined size and have unique column numbers (processing block 782).

An Exemplary Application

In the normal course of operation in one embodiment, it is assumed that the PMS is positioned on a corporate network so that secure communications can occur with an organization's database (in which the records reside that require protection.) In the normal course of operations, it is also additionally assumed that the MMS is positioned so that it can monitor and/or intercept all outbound email communications of the organization.

In this example, assume that the organization seeks protection on a database table called "CustomerRecords" that contains four columns: 1) first name, 2) last name, 3) credit card number, and 4) account balance. Employees of this organization would use the user interface application served by the PMS to specify that the CustomerRecords table required protection against theft via email. The PMS would then build an index of the records in the CustomerRecords table that consists of a hash table derived from the string values of the cells in the database. That is, the values in the cells are used to look values up in the hash table. The hash table itself contains records of the respective row number, column number, and data type of the cell itself. In the (frequent) cases of collisions in the hash table, a "collision list" holds multiple such records of row#, col#, and type. Once all cells in the database table are hashed into such a structure, the index is created and ready to be transmitted to the MMS. Note that the index contains no records of the database data itself. This is a key security constraint satisfied by this system.

After the MMS receives the index, it parses the message and re-creates the hash table in memory in the same fashion as it was created in the PMS.

As the MMS picks up outbound email messages and parses them, it uses this index in the manner described below to detect if any of these emails contain data from the database. This is done by parsing each individual line of text from the email messages. This may involve decoding the surrounding file types and converting everything into raw text (e.g., stripping all formatting information from a Microsoft Word file and leaving only the text itself.) This series of lines of text is then parsed into individual words by looking for separation marks like the "space" character, or other forms of punctuation. These words are text tokens. For each line of text tokens, this system then consults the index by applying the hash function to each token. The result of this operation is a hash table collision list for each token on the line. As described above, each collision list is itself a set of data elements that store possible row number, column number, and type triplets. If the union of all triplets from all collision lists is taken, and if a set of triplets is found with all with the same row number, but with distinct column numbers, then with high probability this line of text from the email message contains a record from the database. It should be noted that the term "tuple" used herein is not limited to the specific case of the triplets of row number, column number, and type and may refer to data structures that do not contain all of these three parameters. For example, in one embodiment, a tuple contains the row number but not the column number and the type of the database data.

Comparison with the Prior Art

Database query mechanisms are significantly different from the teachings described herein. One difference is that B-trees actually contain fragments of the database tables that they index. In the approach described above, there are no copies of the database data stored inside the index. The reason that this is important is that—as mentioned above—the MMS has to have a copy of the index in order to protect the data from escape; however the MMS is also best deployed in a position in the network where it may be exposed to significant threats. Keeping the index that the MMS uses free of any components of the database data is a key requirement.

Another difference between standard database query mechanisms and the invention outlined here has to do with the types of queries that are required. The standard set of queries used in relational databases is based on predicate logic using connectives like AND and OR. This basic system does not work well for detection of database data that is typically cut-and-paste into email and webmail messages. Database data that is cut-and-paste into email messages is typically from reports and will often contain data in each line that is extraneous and not found inside the database table. An example could be an email message that contains, for example, account information for a bunch of customers. Such a message will contain plenty of records from the core database that requires protection, e.g., first name, last name, social-security number, etc., but could also contain information not in the core database tables. A typical example is information that is "joined" from other databases. Another example is simple line formatting tokens that separate fields of database data. Because of the possibility of this extra data that's typically found on each of these lines, the standard predicate logic connectives like AND and OR applied to each token on the line of an outgoing message produce either too many hits (as is the case with OR) or zero hits (as is the case with AND). In the description herein, the system is able to detect the presence of n or more tokens that are all from the same row of a database table, even in the case where n is much smaller than the total number of tokens in the line. This is another significant difference between the present invention and the prior art mentioned above for database and document query mechanisms.

There are several major differences between the techniques described above and information retrieval technologies. Firstly, the indices for these systems contain (inside the concordances) the same terms that are stored in the database that is to be protected. Here again, since the system deploys this index into a location on the network that is potentially under hacker threat; this is a definite disadvantage. Secondly, these query systems run Boolean queries using the forms of predicate logic like AND and OR. As mentioned above, this approach is at a distinct disadvantage for detecting database records that have been possibly "joined" with extraneous data from other tables.

The technique of file shingling is similar to, but substantially different from the technique described herein. In file shingling, the subject of interest is text data (prose, software, outlines, etc.). In the techniques described here, the focus is on protecting database data. One difference is that database data from a given database table may appear with the row order or column order permuted arbitrarily in the test message. These permutations are the simple result of the query mechanisms typically applied to extract database data. A database query could result in a block of database data that comes in arbitrary column order, and arbitrary row order. For this reason, the basic technique of file shingling will not work if applied to database data. File shingling assumes that the same linear sequence is followed between the protected document and the test document.

There are many important differences between internet content filtering systems and the teachings described herein. As mentioned above, Internet content filtering systems are based on keyword searches. The novel techniques described above build an abstract data structure from the database data that it seeks to protect. This abstract data structure does not contain fragments of the text it is trying to protect. A keyword filtering system must contain some representation of the text that it is searching for in order to run its queries. The second major difference is that these Internet content filtering systems are not intended to protect database data. Using regular expression matching to detect violations of an organizations privacy policy on database data will also lead to a very inaccurate method of detection. These systems are primarily applied to stop employee abuse of the Internet as it relates to pornographic or abusive content and language. Such systems, if applied to the protection of database data, would use regular expressions to match database records. This would also result in transferring fragments of the database data to the computer on the network where security risks are maximized.

An Exemplary Computer System

Figure 8:
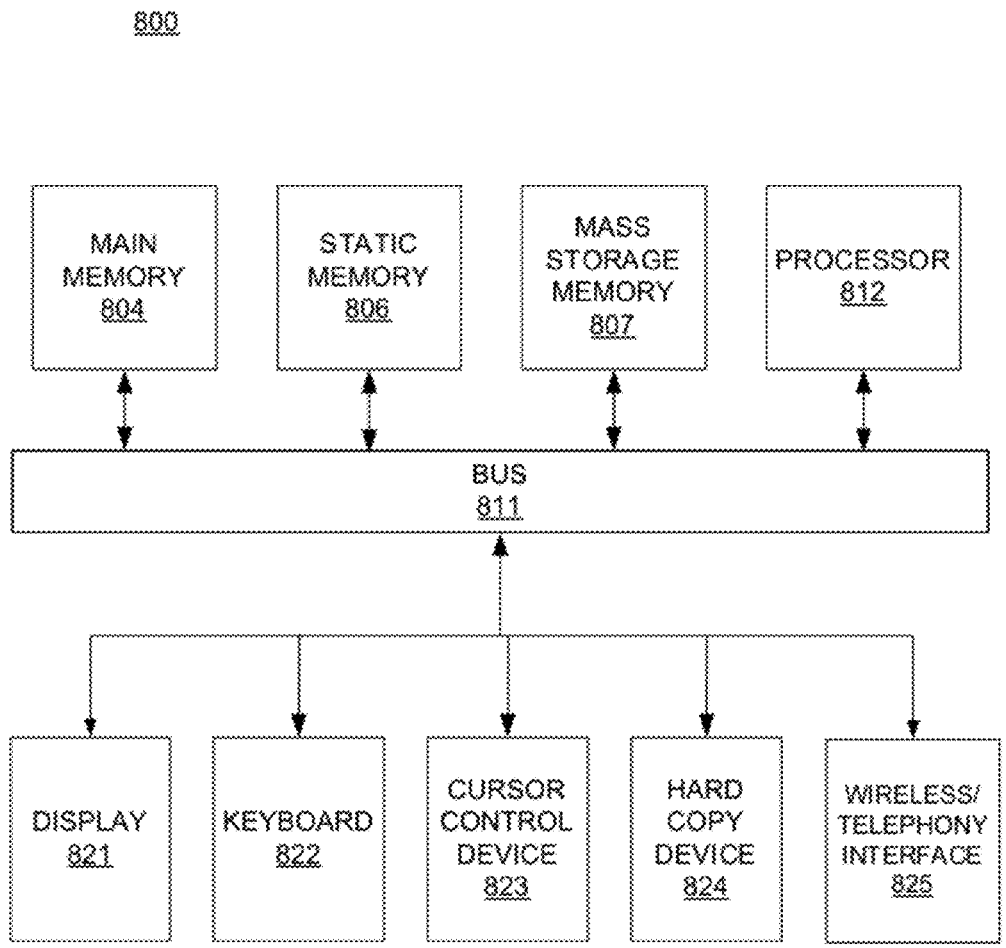
FIG. 8 is a block diagram of an exemplary computer system that may perform one or more of the operations described herein.

FIG. 8 is a block diagram of an exemplary computer system that may perform one or more of the operations described herein. Referring to FIG. 8, computer system 800 may comprise an exemplary client 850 or server 800 computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, PowerPC™, Alpha™, etc.

System 800 further comprises a random access memory (RAM), or other dynamic storage device 804 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   identifying, by a client device, an index of database data to be protected, the database data comprising sensitive data elements and the index comprising positional information identifying relative placement of the sensitive data elements of the database data in relation to other sensitive data elements of the database data, wherein the index does not reveal the sensitive data elements of the database data, and wherein one or more entries in the index comprise a row number of a cell in the database data and a pre-generated hash or encryption of a sensitive data element in the cell in the database data;
   determining, by the client device, whether at least a portion of the database data is possibly contained within information content; and
   in response to determining that a portion of the database data is possibly contained within the information content, performing, by the client device, a search of the information content for at least a portion of the database data using the index, wherein performing the search of the information content comprises:
   searching the index to identify entries in the index that comprise pre-generated hashes or encryptions of the sensitive data elements that correspond to hashes or encryptions of content fragments from the information content;
   determining one or more groups of content fragments, wherein at least one group comprises content fragments associated with hashes or encryptions that correspond to pre-generated hashes or encryptions of entries in the index comprising a same row number; and
   determining that the received information content contains at least a portion of the database data if any group satisfies at least one criterion.

2. The method of claim 1, wherein the at least one criterion comprises a quantity threshold that is satisfied if any group comprises a quantity of content fragments that meets or exceeds the quantity threshold.

3. The method of claim 1, wherein each entry in the index further comprises a column number of the cell, and wherein the at least one criterion comprises a threshold that is satisfied if any group comprises content fragments from a number of different columns that meets or exceeds the threshold.

4. The method of claim 1, wherein determining the groups of content fragments comprises:
   parsing individual lines of text in the information content into the content fragments, wherein each content fragment is one of a word or a phrase; and
   for each individual line of text, performing the following:
   generating hashes of each of the content fragments in the line;
   comparing the hashes of the content fragments in the line to the pre-generated hashes to identify matching entries of the index; and
   arranging the content fragments in the line into the groups based on row numbers associated with the matching entries.

5. The method of claim 1, wherein the database data is maintained in at least one of a spreadsheet or a flat file, the method further comprising:
   determining that a portion of the information content matches a portion of the database data; and
   sending, to a server, a notification of the detection of the portion of the database data in the information content.

6. The method of claim 1, wherein determining that a portion of the database data is possibly contained within the information content comprises:
   searching a body of the information content for an expression comprising a predefined format using a search rule that defines the predefined format, wherein the expression comprising the predefined format is any one of an account number, a social security number, a credit card number, a phone number, a postal code, an email address, a currency amount, or a driver's license number; and
   determining that a region surrounding the expression may contain a portion of the database data, wherein the region surrounding the expression comprises a quantity of contiguous data fragments before the expression and a quantity of contiguous data fragments after the expression.

7. The method of claim 1, wherein the information content is a document stored on a storage medium of the client device.

8. The method of claim 1, wherein the index contains copies of at least some common strings and numbers from the database data.

9. The method of claim 1, wherein determining that a portion of the database data is possibly contained within the information content comprises determining that the information content comprises a sequence of content fragments that resembles column-formatted data.

10. The method of claim 1, wherein determining that a portion of the database data is possibly contained within the information content comprises determining that a word distribution in the information content resembles a statistical pattern that indicates a possible containment of the database data.

11. A non-transitory computer readable storage medium including instructions that, when executed by a processing device, cause the processing device to perform operations comprising:
  identifying, by the processing device, an index of database data to be protected, the database data comprising sensitive data elements, the index comprising positional information identifying relative placement of the sensitive data elements of the database data in relation to other sensitive data elements of the database data, wherein the index does not reveal the sensitive data elements of the database data, and wherein one or more entries in the index comprise a row number of a cell of the database data and a pre-generated hash or encryption of a sensitive data element in the cell of the database data;
  determining, by the processing device, whether at least a portion of the database data is possibly contained within information content; and
  in response to determining that a portion of the database data is possibly contained within the information content, performing, by the processing device, a search of the information content for at least a portion of the database data using the index, wherein performing the search of the information content comprises:
    searching the index to identify entries in the index that comprise pre-generated hashes or encryptions of the sensitive data elements that correspond to hashes or encryptions of content fragments from the information content;
    determining one or more groups of content fragments, wherein at least one group comprises content fragments associated with hashes or encryptions that correspond to pre-generated hashes or encryptions of entries in the index comprising a same row number; and
    determining that the received information content contains at least a portion of the database data if any group satisfies at least one criterion.

12. The non-transitory computer readable storage medium of claim 11, wherein the at least one criterion comprises a quantity threshold that is satisfied if any group comprises a quantity of content fragments that meets or exceeds the quantity threshold.

13. The non-transitory computer readable storage medium of claim 11, wherein each entry in the index further comprises a column number of the cell, and wherein the at least one criterion comprises a threshold that is satisfied if any group comprises content fragments from a number of different columns that meets or exceeds the threshold.

14. The non-transitory computer readable storage medium of claim 11, wherein determining the groups of content fragments comprises:
  parsing individual lines of text in the information content into the content fragments, wherein each content fragment is one of a word or a phrase; and
  for each individual line of text, performing the following:
    generating hashes of each of the content fragments in the line;
    comparing the hashes of the content fragments in the line to the pre-generated hashes to identify matching entries of the index; and
    arranging the content fragments in the line into the groups based on row numbers associated with the matching entries.

15. The non-transitory computer readable storage medium of claim 11, wherein determining that a portion of the database data is possibly contained within the information content comprises determining that the information content comprises a sequence of content fragments that resembles column-formatted data.

16. A computing device comprising:
  a memory to store instructions for protecting database data; and
  a processing device, coupled to the memory, to execute the instructions, wherein the processing device is to:
    identify an index of database data, the database data comprising sensitive data elements, the index comprising positional information identifying relative placement of the sensitive data elements of the database data in relation to other sensitive data elements of the database data, wherein the index does not reveal the sensitive data elements of the database data, and wherein one or more entries in the index comprise a row number of a cell in the database data and a pre-generated hash or encryption of a sensitive data element in the cell;
    determine whether at least a portion of the database data is possibly contained within information content; and
    in response to determining that a portion of the database data is possibly contained within the information content, perform a search of the information content for at least a portion of the database data using the index, wherein performing the search of the information content comprises:
      searching the index to identify entries in the index that comprise pre-generated hashes or encryptions of the sensitive data elements that correspond to hashes or encryptions of content fragments from the information content;
      determining one or more groups of content fragments, wherein at least one group comprises content fragments associated with hashes or encryptions that correspond to pre-generated hashes or encryptions of entries in the index comprising a same row number; and
      determining that the received information content contains at least a portion of the database data if any group satisfies at least one criterion.

* * * * *